US005389477A

United States Patent [19]

Tsuchiya et al.

[11] Patent Number: 5,389,477

[45] Date of Patent: Feb. 14, 1995

[54] PHOTOSENSITIVE MATERIAL FOR ELECTROPHOTOGRAPHY AND METHOD FOR MAKING THE PHOTOSENSITIVE MATERIAL

[75] Inventors: Sohji Tsuchiya, Kanagawa; Atsushi Omote; Hiroki Kusayanagi, both of Kawasaki; Yoshimasa Itoh, Machida; Takahiro Asano, Kawasaki, all of Japan

[73] Assignee: Matsushita Electric Industrial Co., Ltd., Osaka, Japan

[21] Appl. No.: 942,888

[22] Filed: Sep. 10, 1992

[30] Foreign Application Priority Data

| | | | |
|---|---|---|---|
| Sep. 13, 1991 | [JP] | Japan | 3-234381 |
| Sep. 13, 1991 | [JP] | Japan | 3-234382 |
| Oct. 4, 1991 | [JP] | Japan | 3-257394 |
| Nov. 5, 1991 | [JP] | Japan | 3-288327 |
| Nov. 5, 1991 | [JP] | Japan | 3-288328 |
| Dec. 17, 1991 | [JP] | Japan | 3-333166 |
| Dec. 17, 1991 | [JP] | Japan | 3-333167 |
| Dec. 17, 1991 | [JP] | Japan | 3-333168 |
| Dec. 17, 1991 | [JP] | Japan | 3-333169 |
| Feb. 21, 1992 | [JP] | Japan | 4-034607 |

[51] Int. Cl.$^6$ .............. C08G 15/02

[52] U.S. Cl. .............. 430/57; 430/58; 430/59; 430/78; 430/135

[58] Field of Search .............. 430/58, 57, 78, 59, 430/135

[56] References Cited

U.S. PATENT DOCUMENTS

| | | | |
|---|---|---|---|
| 4,990,422 | 2/1991 | Staudenmayer | 430/57 |
| 5,080,991 | 1/1992 | Ono et al. | 430/59 |
| 5,087,540 | 2/1992 | Murakami et al. | 430/58 |
| 5,166,438 | 11/1992 | Mashimoto et al. | 430/57 |
| 5,194,353 | 3/1993 | Tanaka et al. | 430/57 |
| 5,206,103 | 4/1993 | Stolka et al. | 430/78 |
| 5,236,798 | 8/1993 | Aoike et al. | 430/57 |

*Primary Examiner*—John Kight, III
*Assistant Examiner*—John M. Cooney, Jr.
*Attorney, Agent, or Firm*—Lowe, Price, LeBlanc & Becker

[57] ABSTRACT

A photosensitive material for electrophotography comprises a conductive support and a photosensitive layer formed on the conductive support, the photosensitive layer being made of X-type metal-free phthalocyanine, a resin binder, and an essential additive effective for improving electrophotographic or photosensitive characteristics or durability in repeated use wherein the X-type metal-free phthalocyanine is dispersed in the resin binder partly in a molecular state and partly in a particulate state. The essential additive includes electrolytically polymerized products, certain kinds of dyes, silane or polysilane compounds, hole and electron transport substances, titanyl or vanadyl phthalocyanine, electron acceptors, perylene compounds, amine derivatives, amino compounds, zinc oxide or the like.

51 Claims, 2 Drawing Sheets

PHOTOSENSITIVE MATERIAL FOR ELECTROPHOTOGRAPHY AND METHOD FOR MAKING THE PHOTOSENSITIVE MATERIAL

BACKGROUND OF THE INVENTION

1. Field of The Invention

This invention relates to photosensitive materials which are particularly suitable for use in electrophotographic processes including charging, exposing, developing and charge-removing steps and which make use of organic photoconductors and more particularly, to improvements of such photosensitive materials. The invention also relates to a method for making the photosensitive materials of the type mentioned above.

2. Description of the Prior Art

Organic photoconductors have a number of advantages over inorganic photosensitive compounds and have now been studied extensively. Such advantages include the ease in preparation of a variety of compounds exhibiting high sensitivity at different wavelengths depending on the molecular design, little or no ecological problem, and good productivity and economy. Although the organic photoconductors have problems on durability and sensitivity, these characteristic properties have been remarkably improved at present. Some organic photoconductors have now been in use as a main photosensitive material for electrophotography.

Known organic photoconductive materials usually have a double-layer structure which includes a charge generation layer capable of absorbing light to generate carriers and a charge transport layer wherein the generated carriers are transported. Known materials used to form the charge generation layer include perylene compounds, various phthalocyanine compounds, thia pyrylium compounds, anthanthrone compounds, squalilium compounds, bisazo compounds, trisazo pigments, azulenium compounds and the like.

On the other hand, the materials used to form the charge transport layer include various types of hydrazone compounds, oxazole compounds, triphenylmethane compounds, arylamine compounds and the like.

There is now a high demand for photosensitive materials for digital recording such as by laser printers wherein organic photosensitive compounds are used in a near ultraviolet range corresponding to semiconductive laser beams with a wavelength ranking from 780 to 830 nm. Accordingly, organic photosensitive compounds having high sensitivity in the above-indicated near ultraviolet range have been extensively studied and developed. In view of the sensitivity in the above UV range, organic photosensitive compounds are more advantageous than inorganic photosensitive metals or compounds.

The organic photosensitive compounds are usually employed in combination with binder resins and applied onto substrates, such as drums, belts and the like, by relatively simple coating techniques. Examples of the binder resins used for this purpose include polyester resins, polycarbonate resins, acrylic resins, acryl-styrene resins and the like.

In general, with the double-layer structure, the charge generation layer is coated in a thickness of about one micrometer in order to attain high sensitivity. The charge transport layer is applied in a thickness of 10 to 20 micrometers. From the standpoint of the physical strength and the printing resistance, the charge generation layer should generally be formed directly on the substrate and the charge transport layer is formed as a surface layer. In this arrangement, charge transport compounds which are now in use are only those which work by movement of positive holes. Thus, the known photosensitive materials with the double-layer structure are of the negative charge type.

The negative charge systems, however, have several disadvantages: (1) during negative charging, oxygen in air is attacked and converted to ozone; (2) charging does not proceed stably; (3) the system is apt to be influenced by surface properties of a substrate such as a drum. Ozone is disadvantageous in that not only ozone is harmful to human body, but also it often reacts with organic photosensitive compounds to shorten the life of the photosensitive materials. The unstable charging often invites a lowering of image quality. In addition, the great influence of the substrate surface undesirably necessitates mirror finishing of the substrate or formation of an undercoat layer, resulting in an increase of production costs.

Moreover, the double-layer structure has the problems that the fabrication process becomes complicated with a poor yield and the stability is not good owing to possible separation between the layers. To solve the problems, there has been proposed a photosensitive material which has a single-layer structure. In either case, there has been a demand for further improvements of photosensitivity and stability in repeated use wherein a charging and residual potential removing cycle is repeated.

SUMMARY OF THE INVENTION

It is accordingly an object of the invention to provide an organic photosensitive material having a single-layer structure which has improved photosensitivity and good durability.

It is another object of the invention to provide an organic photosensitive material with a single-layer structure which has a good printing resistance and improved thermal stability and whose photosensitivity suffers a reduced influence of environmental changes.

It is a further object of the invention to provide an organic photosensitive material of the positive charge type which has good photosensitivity over a wide range of wavelength and has wide utility not only in the field of laser printers but also in ordinary duplicators.

It is a still further object of the invention to provide an organic photosensitive material of the positive charge type with a single-layer structure wherein X-type metal-free phthalocyanine is employed along with resin binders and an essential additive ingredient.

It is another object of the invention to provide a method for making an organic photosensitive material having a single-layer structure comprising X-type metal-free phthalocyanine.

Broadly, the above objects can be achieved, according to the invention, by an organic photosensitive material for electrophotography which comprises a conductive support and a photosensitive layer formed on the conductive support, the photosensitive layer being made of X-type metal-free phthalocyanine, a resin binder, and an essential additive effective for improving electrophotographic or photosensitive characteristics and/or durability in repeated use wherein the X-type metal-free phthalocyanine is dispersed in the resin binder partly in a molecular state and partly in a particulate state.

In a specific embodiment which makes use of an electrolytically polymerized material as the essential additive, it is not always necessary to use X-type metal-free phthalocyanine and to constitute the photosensitive layer as a single layer. More particularly, a double-layer structure may be used wherein the electrolytically polymerized material may be added to a charge transport sub-layer or to a charge generation sub-layer.

For the fabrication of the organic photosensitive material for electrophotography, there is provided a method which comprises:

(a) dissolving X-type metal-free phthalocyanine in a solution of a resin binder in a solvent capable of dissolving at least a part of X-type metal-free phthalocyanine until at least a part of X-type metal-free phthalocyanine is dissolved in the solution in a molecular state;
(b) adding an essential additive to the resultant solution;
(c) applying the resultant solution onto a conductive support; and
(d) drying the applied mixture to form a photosensitive layer on the conductive support.

DETAILED DESCRIPTION AND EMBODIMENTS OF THE INVENTION

Figure 1:
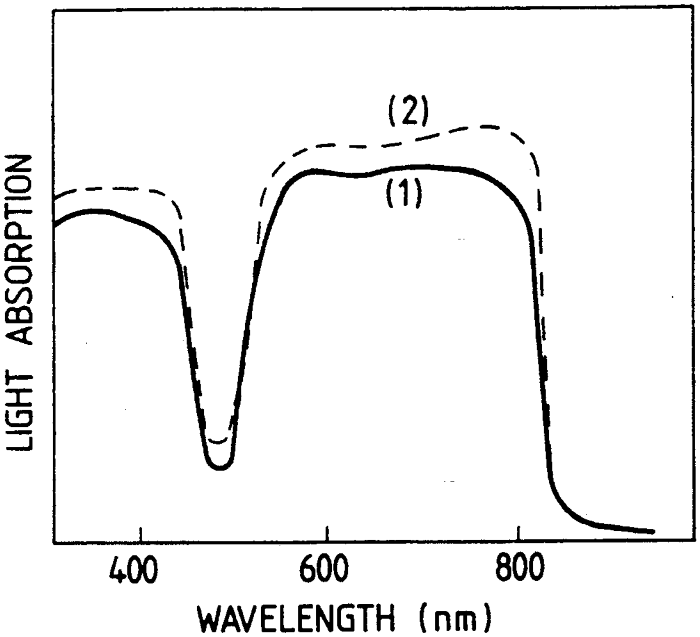
FIG. 1 is a graph showing a light absorption characteristic of a photosensitive layer made of X-type metal-free phthalocyanine which is dispersed in a resin binder in molecular and particulate states with or without use of titanyl phthalocyanine additive.

Photosensitive materials which make use of X-type metal-free phthalocyanine are described, for example, in U.S. Pat. No. 5,087,540, assigned to the same applicant. This patent is incorporated herein by reference. As stated in this patent, when X-type metal-free phthalocyanine is dissolved in a solvent capable of dissolving at least a part of the phthalocyanine along with a resin binder and is applied as a photosensitive layer, the layer exhibits photosensitivity higher than that of known positive charge-type organic photosensitive materials. The X-type phthalocyanine dissolved in this manner has the capability of charge transport although it has been considered as a charge generation agent. Moreover, unlike known charge transport materials, the X-type metal-free phthalocyanine has the ability of transporting positive charges. It is considered that the transportability of positive charges is ascribed to X-type phthalocyanine which has been dispersed in the resin binder in a molecular state. On the other hand, the ability of charge generation is ascribed to the particulate dispersion of X-type phthalocyanine in tile resin binder.

With some exceptions, the photosensitive material of the invention fundamentally makes use of X-type metal-free phthalocyanine which is dissolved in a solvent capable of dissolving at least a part thereof along with a resin binder. In order to improve electrophotographic characteristics and durability and extend a usable wavelength range of the photosensitive layer, specific types of essential additives are, respectively, added to the combination of the X-type metal-free phthalocyanine and the resin binder.

A first embodiment of the invention is described.

In this embodiment, there is provided a photosensitive material for electrophotography which comprises a conductive support and a single-layer photosensitive structure formed on the support. The single-layer structure is formed of a X-type metal-free phthalocyanine and a binder resin at a mixing ratio by weight of 1:10 to 1:1 in such a way that the phthalocyanine is dispersed in the binder resin partly in a molecular state and partly in a particulate state. In this embodiment, it is essential that an electrolytically polymerized material be contained in the mixture of the X-type metal-free phthalocyanine and the binder resin in an amount of 1 to 50 wt % based on the phthalocyanine. By the incorporation of the material obtained by electrolytic polymerization, the photosensitive characteristics are improved along with improved stability of the photosensitive material when repeatedly charged and optically discharged.

The conductive support useful in this and other embodiments of the invention is not critical and includes, for example, metal sheets such as Al sheets, and glass, paper or plastic sheets on which a metal is vapor deposited to form a conductive layer. The support may be in the form of drums, belts, sheets and the like. If the support has surface irregularities, an underlayer may be provided.

X-type metal-free phthalocyanine is described in detail in the above-indicated United States Patent and is not described herein.

Binder resins should preferably be dissolved in solvents for the phthalocyanine. Examples of the binder resins include polymers having vinylphenol units therein, polyesters, polyvinyl acetate, polyvinyl chloride, polyvinylidene chloride, polycarbonates, polyvinyl butyral, polyvinyl acetoacetal, polystyrene, polyacrylonitrile, polymethyl methacrylate, polyacrylates, polyvinyl carbazoles, copolymers of the monomers used in the above-mentioned polymers, vinyl chloride/vinyl acetate/vinyl alcohol terpolymers, vinyl chloride/vinyl acetate/maleic acid terpolymers, ethylene/vinyl acetate copolymers, vinyl chloride/vinylidene chloride copolymers, melamine resins, alkyd resins, cellulose polymers, siloxane polymers, and mixtures thereof. In view of adhesion to supports such as of Al, polyester and polycarbonate resins are preferred. 0f course, the polyesters and polycarbonates may be modified by copolymerization with acrylates, amides and the like monomers in order to facilitate dissolution in solvents.

The electrolytically polymerized materials used as an essential additive of the invention are preferably anion-doped oligomers or polymers of five-membered ring-bearing heterocyclic compounds having recurring units of the following formula (I)

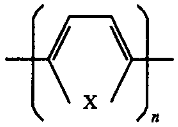 (I)

wherein X represents N, S or O and n is an integer of not smaller than 3. Preferably, n is an integer of up to 50. Specific examples include polypyrroles and polythiophenes doped with anions. Such materials are readily obtained by polymerizing a monomer such as pyrrole or its derivative, thiophene or its derivative in a solution of an organic electrolyte. By the electrolytic polymerization, the anion-doped polymer is formed on an anode in the form of a film. For mixing with X-type metal-free phthalocyanine and a binder resin, the film is preferably divided into fine pieces. For this purpose, the polymerized material should preferably be in the form of an oligomer. The anion is preferably doped at a level of 30 to 35wt % of the polymerized material. Derivatives of pyrrole and thiophene include, for example, alkylpyrroles and alkylthiophenes and the like.

The properties of the photosensitive material, more or less, depend on the type of doped anion. When aromatic anions are used, the resultant photosensitive material is significantly improved in photosensitivity and stability. Examples of the aromatic anions include alkylbenzenesulfonates, alkylbenzenecarbonates, alkylnaphthalenesulfonates, alkylnaphthalenecarbonates and the like. One or more alkyl moieties each having from 1 to 6 carbon atoms may be Joined to the aromatic ring of these compounds. There may also be used alkyl-free compounds.

In general, when additives are added to organic photoconductors so as to improve sensitivity, stability of the photoconductors becomes worsened. The addition of the electrolytically polymerized material can improve not only photosensitive characteristics, but also stability in repeated use, image characteristics and printing resistance.

Fabrication of the photosensitive material according to the first embodiment is described.

Initially, X-type metal-free phthalocyanine is added to a resin solution or a solvent along with a resin binder and is dispersed therein. When the mixing under agitation or ball milling is effected to a satisfactory extent, the phthalocyanine becomes finer in size and a part thereof is dissolved in the resin solution. The dissolution can be confirmed by an increase of the viscosity of the solution. In this state, the phthalocyanine is considered to exist in the solution partly in a particulately dispersed state and partly in a molecularly dispersed state. The molecularly dispersed phthalocyanine is considered to be different in crystal form from the particulately dispersed phthalocyanine. This molecularly dispersed phthalocyanine is assumed to have the function of transporting charges. The X-ray diffraction pattern of the X-type phthalocyanine dissolved in a resin solution is apparently different from that of X-type metal-free phthalocyanine dissolved in a solvent alone and is also different from those of α- and β-type metal-free phthalocyanines. From this, at least a part of the X-type metal-free phthalocyanine is considered to be molecularly dispersed In the resin solution and is believed to be converted into a new crystal form. The dissolution of the phthalocyanine in the resin solution to an extent that it is molecularly dispersed In the solution takes a relatively long time of, for example, one to ten days under ordinary kneading or mixing conditions.

The solvents capable of dissolving X-type metal-free phthalocyanine include, for example, nitrobenzene, chlorobenzene, dichlorobenzene, dichloromethane, trichloroethylene, chloronaphthalene, methylnaphthalene, benzene, toluene, xylene, tetrahydrofuran, cyclohexanone, 1,4-dioxane, N-methylpyrrolidone, carbon tetrachloride, bromobutane, ethylene glycol, sulforane, ethylene glycol monobutyl ether, acetoxyethoxyethane, pyridine, methyl cellosolve, isophorone and the like. The above solvents may be used singly or in combination. If necessary, X-type phthalocyanine is at least partly dissolved in one solvent and a binder resin may be dissolved in another solvent which does not serve as a solvent for X-type phthalocyanine. Subsequently, the resultant solutions are mixed so that X-type phthalocyanine is dispersed in the resin partly in a molecular state and partly in a particulate state.

X-type metal-free phthalocyanine is not dissolved in compounds such as acetone, cyclohexane, petroleum ether, nitromethane, methoxy ethanol, dimethylformamide, dimethylacetamide, acetonitrile, dimethylsulfoxide, ethyl acetate, isopropyl alcohol, diethyl ether, methyl ethyl ketone, ethanol, hexane, propylene carbonate, butylamine, water and the like. If these compounds are used as a solvent for resin binders, compounds capable of dissolving the phthalocyanines have to be used in combination as stated above.

The phthalocyanine and the binder resin should be mixed at a ratio by weight of 1:10 to 1:1 in this and other embodiments of the invention.

Then, the electrolytically polymerized material in the form of powder is added to the dispersion or solution to uniformly disperse the powder in the dispersion. The powder is added in an amount of from 1 to 50 wt % based on the X-type metal-free phthalocyanine.

The dispersion or solution is applied onto a conductive support by dipping, bar coating, gravure coating, blade coating, spin coating, calender coating and the like coating techniques in a dry thickness of from 4 to 50 μm for the single-layer structure.

Finally, the applied layer is dried preferably in vacuum at a temperature of from 50° to 180° C. for a sufficient time to form a photoconductive layer on the support as usual. Moreover, the photosensitive material of the invention may further comprise a protective layer made of insulating resins and formed on the photosensitive layer. Alternatively, a blocking layer may be further provided between the substrate and the photosensitive layer.

The photosensitive material obtained in this embodiment of the invention is of the positive charge type. When they may be negatively charged, the sensitivity is significantly reduced with a low charge potential.

In this embodiment using the electrolytically polymerized material, the single-layer structure has been described hereinabove. Similar results are obtained using a double-layer structure which comprises a charge generation layer and a charge transport layer formed on a conductive support in this order provided that the electrolytically polymerized material is contained in either the charge generation layer or the charge transport layer.

In the second embodiment, the charge generating agent used in the charge generation layer may be not only X-type metal-free phthalocyanine, but also other agents which can be uniformly dispersed in a binder resin and an electrolytically polymerized material. Such agents include, for example, other types of metal-free phthalocyanines such as α, β, γ, and τ phthalocyanines and metallo-phthalocyanines in which metals include Cu, Mg, In—Cl, Al—Cl, Ti—O and the like. Of these, X-type metal-free phthalocyanine is preferred.

If the electrolytically polymerized material is added to the charge generation layer, the layer may be formed in a manner similar to the first embodiment. That is, a charge generating agent and a binder resin are dispersed in a solvent as used in the first embodiment, to which an electrolytically polymerized material is added in an amount as set out hereinbefore. The charge generation layer is formed in a thickness of 0.2 to 2 micrometers. Thereafter, a charge transport layer is formed on the charge generation layer in a thickness of from 5 to 40 micrometers.

The charge transporting agents used for this purpose may be those which are known in the art as such. Examples include hydrazone compounds, oxazole compounds, triphenylmethane compounds, arylamines compounds and the like.

As a matter of course, the electrolytically polymerized material may be added to the charge transport layer instead of the charge generation layer, by which similar results are obtained.

The charge generating or transporting agent and the binder resin should be mixed at a ratio by weight of 1:10 to 1:1.

Then, the electrolytically polymerized material in the form of powder is added to the dispersion of the resin binder and the agent to uniformly disperse the powder in the dispersion. The powder is added in an amount of from 1 to 50 wt % based on the charge generating or transporting agent.

In this double-layer structure, either the charge generating or transporting agent may be dispersed in a resin binder of the type as used in the first embodiment by a simple mixing operation. The agent may be dispersed merely in a particulate state in the resin binder. The photosensitive material having the double-layer structure is of the negative charge type. By using the electrolytically polymerized material, the photosensitivity and stability in repeated use are improved.

Third to eighth embodiments of the invention are described. In these embodiments, the photosensitive material is so arranged as in the first embodiment. In the first embodiment, an electrolytically polymerized material is uniformly dispersed in the combination of X-type metal-free phthalocyanine and a binder resin to form a single-layer structure. In the embodiments described hereinafter, the electrolytically polymerized material used as the essential additive is replaced by other types of additives so that some properties are significantly improved over those attained by the combination of X-type metal-free phthalocyanine and a binder resin. Accordingly, the binder resins, solvents and fabrication conditions as stated with respect to the first embodiment are fundamentally applicable to the embodiments described hereinafter unless otherwise stated.

It has been found that when a specific type of dye, silicone compounds and fluorine-containing compounds, polysilane compounds, or vanadyl or titanyl phthalocyanine is added as the essential additive, the resultant photosensitive materials are improved in photosensitivity, stability or durability in repeated use, printing resistance, thermal stability and/or an environmental resistance of the photosensitivity.

In these embodiments, X-type metal-free phthalocyanine and binder resins are dispersed or dissolved in a solvent as in the first embodiment so that the phthalocyanine is dispersed in the binder resin partly in a molecular state and partly in a particulate state. In the dispersion, one of the above-mentioned additives is added as in the first embodiment.

These additives are described one by one.

In accordance with a third embodiment, there is used a dye of the following formula (II) as the essential additive in order to improve the photosensitivity and stability in repeated use

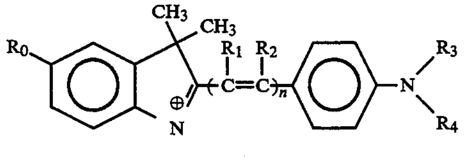

(II)

wherein $R_1$, $R_2$, $R_3$ and $R_4$ independently represent hydrogen or a lower alkyl group having from 1 to 6 carbon atoms such as methyl, ethyl, propyl, butyl, pentyl, hexyl or the like, $R_0$ represents hydrogen, a lower alkyl group as defined above, or a halogen atom, $R_5$ represents an alkyl group terminated with —OH, —SH or —NH, and X represents an acceptor group such as a halogen atom, $—ClO_4$, $—PF_5$ or $BF_4$.

It is known that dyes have an absorption peak or peaks in a visible spectral range and exhibit a sensitizing effect when added to a photoconductor. The addition of the dye of the formula is considered to contribute not only to the light absorption, but also to improving charge transport. The dye of the formula (II) has a light absorption peak in the range of 450 nm to 800 nm. When a photosensitive material using the dye of the formula (II) is subjected to measurement of photosensitive characteristics by the use of a wavelength outside the above-indicated range, the photosensitivity and stability in repeated use are improved. From this, it will be appreciated that by application of light, charge carrying and transporting properties are improved rather than charge-generating properties are improved.

The photosensitive material obtained by this embodiment exhibits good photosensitivity when charged positively. Although the photosensitive material may be used by negative charging, the resultant photosensitivity becomes as low as a fraction of that attained by positive charging. The photosensitive material using the dye defined above is unlikely to suffer an influence of temperature and humidity.

For the fabrication of the photosensitive material, an X-type metal-free phthalocyanine and a binder resin are dispersed in a solvent as set out hereinbefore with or without the dye. In order to attain good photosensitive and other characteristics, it is necessary that X-type metal-free phthalocyanine, the dye and a binder resin used be miscible with one another. If the miscibility is poor, the respective ingredients may not be dispersed uniformly in the resultant solid photosensitive layer, or phase separation may take place in the layer. This adversely influences properties of the layer, resulting in lowerings of the degree of generation of photo-charges, the degree of movement of charges from the charge generator to the charge transporter, the charge transport efficiency and the like.

In view of the miscibility of the dye with a binder resin and the photosensitive characteristics, the resin should preferably have an aromatic ring. Preferable examples include polystyrene, polyesters, polycarbonates, polyvinylcarbazoles, polyphenols, copolymers of monomers for these aromatic ring-bearing polymers with copolymerizable monomers, and mixtures thereof. In general, aluminum is used as the conductive support. From the standpoint of the adhesion to the Al support and the affinity for toner in electrophotographic processes, the most preferable binder resins include polycarbonates and polyesters. For ensuring easy dissolution in solvents, the polyesters and polycarbonates may be modified by copolymerization with acrylates, amides and the like monomers as stated in the first embodiment.

The dye is used in an amount of from 0.01 to 1 mole per mole of X-type metal-free phthalocyanine.

The photosensitive material using the dye is significantly improved in photosensitive characteristics and stability of the photosensitive characteristics in repeated use and exhibit's a reduced degree of variation of the photosensitive characteristics with respect to the environmental change.

Use of silane coupling agents as the essential additive according to a fourth embodiment is described. The silane coupling agents are useful for Improving response and stability characteristics of the photosensitive material.

Silane coupling agents useful for this purpose should have at least one hydrolyzable group and include, for example, γ-(2-aminomethyl)aminopropyltrimethoxysilane, γ-(2-aminoethyl)aminopropylmethyldimethoxysilane, aminosilane, γ-methacrloxypropylmethoxysilane, N-β-(N-vinylbenzylaminoethyl)-γ-aminopropyltrimethoxysilane.hydrochloride, γ-glycidoxypropyltrimethoxysilane, γ-mercaptopropyltrimethoxysialne, γ-aminopropyltriethoxysilane, methyltrimethoxysilane, methyltriethoxysilane, vinyltriacetoxysilane, γ-chloropropyltrimethoxysilane, hexamethyldisilazane, γ-anilinotrimethoxysilane, vinyltrichlorosilane, vinyltrimethoxysilane, vinyltriethoxysilane, vinyltris-(β-methoxyethoxy)silane, octadecyldimethyl[3-(triemthoxysilyl)propyl]ammonium chloride, γ-chloropropylmethyldimethoxysilane, γ-mercaptopropylmethyldimethoxysilane, methyltrichlorosilane,dimethyldichlorosilane, trimethylchlorosilane, N-allyl-γ-aminopropyltrimethoxysilane, and silane compounds having at least two aminopropyl groups, N-morpholino-γ-propyltrimethoxysilane, and di or trimethoxysilanes having a phenyl, diphenyl, phenylmethyl or diphenylmethyl group. These may be used singly or in combination. The silane coupling agents may not be limited to those indicated above but may be used if they have at least one hydrolyzable group as set out hereinabove.

The silane coupling agent is used in an amount of from 0.01 to 0.5 moles per unit mole of X-type metal-free phthalocyanine.

A fifth embodiment using polysilane compounds is described. The polysilanes are useful for providing an electrophotographic photosensitive material which has improved photosensitive characteristics, a reduced residual potential and a high charge generation rate. Moreover, when polysilanes are added, the resultant material has a reduced degree of degradation in repetitions of charging, developing and transferring steps and a high environmental resistance. Since the high environmental resistance is imparted to the material, stable characteristics are ensured when the material is placed under severe conditions such as of low and high temperatures and low and high humidities. The polysilane compound has good ability of transporting carriers and good adhesion to a support.

The polysilanes useful in the present invention may be polycondensates of silane compounds. Examples of the silane compounds include dihalogensilanes such as dichlorosilane, dimethyldlchlorosilane, methylphenyldichlorosilane, diphenyldichlorosilane and the like, and dichlorosilanes such as tetramethyldichlorodisilane, trimethylphenyldichlorodisilane, dimethyldiphenyldichlorodisilane, dimethyldiethyldichlorodisilane and the like although not limitative.

The binder resins set out with respect to the first embodiment are all usable in this embodiment. It is preferred in view of tile miscibility with the polysilanes to use resins which have aromatic ring or rings. Typical examples include polystyrene, polyesters, polycarbonates and the like. More preferably, resins which have both an aromatic ring and an OH group and Br are used. Such a resin is commercially available under the designation of FOC 10 from Fuji Pharm. Co., Ltd. Of course, copolymers of monomers having an aromatic ring with or without OH group and Br with vinyl chloride, vinyl butyral, acrylonitrile,acrylates, methyl methacrylates, vinyl acetate vinylidene chloride, vinyl acetal and the like may be likewise used as preferred ones. In addition, blends of the aromatic ring-bearing polymers with other polymers such as polyvinyl chloride, polyvinylbutyral, polyacrylonitrile, polyacrylates, polymethyl methacrylate, polyvinyl acetate, polyvinylidene chloride, polyvinyl acetal and the like, may also be used.

Moreover, heat or light-curable resins may be used as the binder resin in order to improve the printing resistance. Examples of such curable resins include polyurethanes, polymelamines, polyepoxides and the like. These curable resins may be used singly or in combination with the above-mentioned preferred resins.

The polysilanes are used in an amount of from 0.1 to 50 wt % of X-type metal-free phthalocyanine.

A sixth embodiment wherein the single-layer structure comprises a hole transport substance and an electron transport substrate as the essential additives is described.

The photosensitive material having a single-layer structure which is made of X-type metal-free phthalocyanine dispersed in a binder resin partly in a molecular state and partly in a particulate state exhibits a relatively high light absorption characteristic relative to light having a wavelength not higher than 780 nm. However, the absorption characteristic to light having a wavelength higher than 800 nm is considerably degraded. Where the photosensitive material is applied to laser printers, it is important to note that since there is a high demand for miniaturization and low costs of such printers, semiconductor laser devices have been widely employed as a light-exposing source. In most cases, the semiconductor laser devices have a stable emission wavelength in a region not lower than 780 nm. In order to effectively use the light energy from the laser device, the photosensitive material should have better absorption characteristics relative to light having a wavelength of 780 nm to 850 nm.

To this end, the single-layer structure should comprise a hole transport substance and an electron transport substance dispersed in the combination of X-type metal-free phthalocyanine and a binder resin as defined in the foregoing embodiments.

The hole transport substance useful in the invention is of the following formula (III) or (IV)

(III)

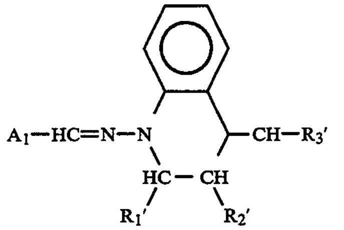

wherein $A_1$ represents an unsubstituted or substituted aromatic hydrocarbon group or aromatic heterocyclic group, $R_1'$, $R_2'$ and $R_3'$ independently represent hydrogen, a halogen or an unsubstituted or substituted alkyl group, aralkyl group or aryl group, (IV)

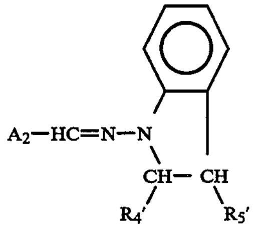

wherein $A_2$ represents an unsubstituted or substituted aromatic hydrocarbon group or aromatic heterocyclic group, $R_4'$ and $R_5'$ independently represent hydrogen, a halogen or an unsubstituted or substituted alkyl group, aralkyl group or aryl group.

The unsubstituted or substituted aromatic hydrocarbon group or aromatic heterocyclic group represented by $A_1$ and $A_2$ includes, for example, unsubstituted or substituted benzene,naphthalene, furan, thiophene, pyrrole, thiazole, imidazole, and the like. The unsubstituted or substituted alkyl group, aralkyl group or aryl group represented by $R^{1'}$, $R^{2'}$, $R^{3'}$, $R^{4'}$ and $R^{5'}$ includes, for example, an alkyl group such as methyl, ethyl, propyl, butyl,pentyl, hexyl or the like, an aralkyl group such as benzyl, methylbenzyl, napthylmethyl, naphtylethyl or the like, and an aryl group such as phenyl, tolyl, xylyl, biphenyl, naphthyl or the like.

The electron transport substances include disazo pigments, perylene pigments, anthanthrone pigments, thiapyrylium salt derivatives, pyrylium salt derivatives, cyanine dye derivatives, at least one of which is used as the electron transport substance.

The hole and electron transport substances are, respectively, used in an amount of from 0.01 to 5 moles per mole of X-type metal-free phthalocyanine.

These substances are added to X-type phthalocyanine and a binder resin prior to, during or after completion of dispersion of X-type phthalocyanine and a binder resin in a solvent.

According to a seventh embodiment of the invention, there is provided a photosensitive material which has a single-layer structure photosensitive layer comprising a silicone compound and a fluorine-containing compound. By the addition of the silicone compound and the fluorine-containing compound, the resultant photosensitive material is imparted with an environmental resistance and particularly, with a humidity resistance.

In general, silicone compounds or fluorine-containing compounds are water repellent in nature. When these compounds are added to a photosensitive layer, the humidity resistance can be improved but inherent photosensitive characteristics are degraded. In fact, it has been found that when either a silicone compound or a fluorine-containing compound is added to the combination of X-type metal-free phthalocyanine and a binder resin, the photosensitive characteristics are lowered. This becomes more pronounced when these compounds are added in the form of a liquid.

This embodiment is based on the findings that (1) both a silicone compound and a fluorine-containing compound are used in combination; (2) both compounds becomes a stable solid phase when a photosensitive layer is formed by drying; (3) either of the compounds should preferably have an amino group or a carbonyl group whereby not only water repellence is improved, but also photosensitive characteristics are also improved; and (4) if these compounds are used in excess, the photosensitive layer is degraded in mechanical strength with a lowering of a cleaning characteristic or affinity for toner.

Silicone compounds useful in the present invention are, for example, amino-modified silicone compounds and alkoxy-modified, carboxy-modified, hydroxy-modified and the like silicone compounds.

Fluorine-containing compounds include, for example, fluorine-containing monomer grafted polymers such as acrylic resins graft-polymerized with fluorine-containing monomers such as mono, dl, tri and tetrafluoroethylene.

The silicone compound and the fluorine-containing compound are, respectively, added in an amount of from 0.1 to 5 wt % of the total solids in the photosensitive layer.

The binder resin used in combination with these additives should preferably have an aromatic ring in view of the miscibility of the resultant mixture. Preferably, there are used polystyrene, polyesters, polycarbonates, polyvinyl carbazoles, polyphenols and mixtures thereof, and copolymers of monomers for these polymers with other copolymerizable monomers. Of these, polyester and polycarbonate resins are more preferred.

An eighth embodiment of the invention is described. In this embodiment, vanadyl phthalocyanine or titanyl phthalocyanine is added to the combination of X-type metal-free phthalocyanine and a binder resin.

Vanadyl phthalocyanine or titanyl phthalocyanine is known as a charge generating agent. These compounds are generally applied as a charge generating layer of a double-layer structure of tile negative charge type. Vanadyl phthalocyanine or titanyl phthalocyanine is less soluble in organic solvents than X-type metal-free phthalocyanine. It is not possible to disperse these phthalocyanine compounds partly in a particulate state and partly in a molecular state, like X-type metal-free phthalocyanine. Accordingly, good photosensitive characteristics are not obtained using a single-layer structure which makes use of vanadyl or titanyl phthalocyanine alone.

We have found that when vanadyl or titanyl phthalocyanine is added to the combination of X-type metal-free phthalocyanine and a binder resin, the light absorption in a visible range (600 to 800 nm) is increased with an improvement in charge transportability. This is more particularly described with reference to the accompanying drawings.

FIG. 1 shows a light absorption characteristic. In the figure, curve (1) is a light absorption curve for a photosensitive material made of X-type metal-free phthalocyanine dispersed in a polyethylene terephthalate resin partly in a particulate state and partly in a molecular state. Curve (2) is for a photosensitive material in which titanyl phthalocyanine is further added in the same amount as the X-type phthalocyanine in curve (1).

Figure 2:
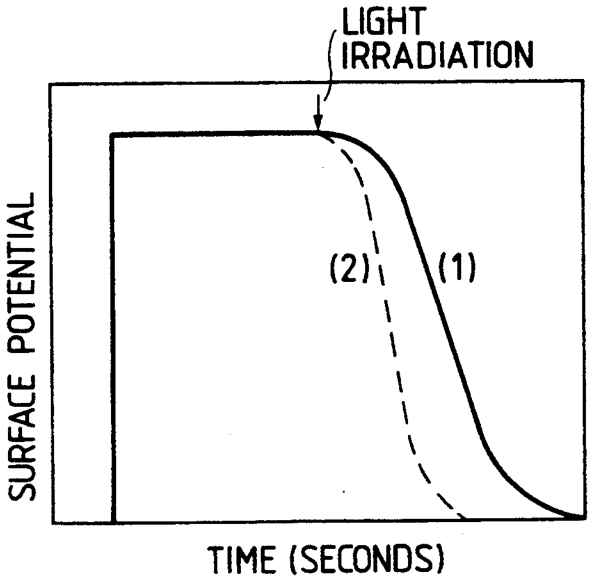
FIG. 2 is a light attenuation curve of a photosensitive layer made of X-type metal-free phthalocyanine which is dispersed in a resin binder in molecular and particulate states with or without use of titanyl phthalocyanine additive.

FIG. 2 shows a light attenuation graph. Curve (1) is for a photosensitive material made of X-type metal-free phthalocyanine dispersed in a polyethylene terephthalate resin as in FIG. 1. Curve (2) is for the case which further comprises titanyl phthalocyanine. From the figure, two characteristic changes will be seen. One resides in that the attenuation change immediately after light irradiation becomes greater when titanyl phthalocyanine is added. Another is that the gradient of the curve in the vicinity of a level where the surface potential reduces to approximately a half becomes sharper. Similar results are obtained using vanadyl phthalocyanine.

In this embodiment, binder resins should preferably have an aromatic ring as in the foregoing embodiments. More preferably, polyester and polycarbonate resins are used.

Vanadyl or titanyl phthalocyanine is added in an amount of from 0.01 to 2 moles per unit mole of X-type metal-free phthalocyanine. If the amount exceeds the upper range, characteristics of a photosensitive material of the particulate dispersion type appear. More particularly, the repeated charging and discharging cycle characteristics are lowered with a lowering of the ozone resistance.

According to a ninth embodiment, there is provided a photosensitive material which makes use of a dispersion of X-type metal-free phthalocyanine, a binder resin and a charge acceptor compound. The charge acceptor compound is used in an amount of from 0.01 to 0.5 moles per unit mole of the metal-free phthalocyanine.

Examples of the charge acceptor compound include polycyclic aromatic nitro compounds such as tetracyanoethylene, tetracyanoquinodimethane and the like, and polycyclic aromatic nitro compounds such as trinitroanthracene, trinitrofluorenone, tetranitrofluorenone and the like.

When these compounds are added in amounts larger than the above-defined range, photosensitivity is apparently increased with a sacrifice of stability in repeated use and electrophotographic characteristics such as a potential retention.

The photosensitive material of this embodiment is improved in photosensitive characteristics, stability in repeated use and image characteristics.

A tenth embodiment is described.

In this embodiment, the essential additive is a combination of a thiapyrylium dye and 1,1-bis(4-N,N-diethylamino-2-methylphenyl)-1-phenylmethane. Specific examples of the thiapyrylium dye include triphenylthiapyrylium perchlorate.

The amounts of the dye and the phenylmethane compound are, respectively, from 0.01 to 5 moles and 0.01 to 5 moles per unit mole of the X-type phthalocyanine.

In this case, a polyester or polycarbonate resin is preferably used as the binder resin.

An eleventh embodiment is described wherein a perylene compound is added as the essential additive.

As stated hereinbefore, the photosensitive material made of X-type metal-free phthalocyanine and a binder resin exhibits good spectral sensitivity in a wavelength of from 600 to 800 nm. However, the spectral sensitivity to a wavelength smaller than 550 nm is as small as 5.0 to 10.0$\mu$ J/cm$^2$. Accordingly, such a photosensitive material is not suitable for use in ordinary duplicators which make use of a halogen or tungsten lamp as a light source.

The photosensitive material of this embodiment is applicable not only to ordinary duplicators but also laser printers. More particularly, the material exhibits photosensitivity in an extended wavelength range while keeping high stability and high photosensitive characteristics.

As is known in the art, a perylene compound serves as a p-type photoconductor when exposed to light having a wavelength of 400 to 600 nm. We have found that when a small amount of a perylene compound is added to a combination of X-type metal-free phthalocyanine and a binder resin dispersed in a manner as set forth hereinbefore, the sensitivity to light having a wavelength of from 400 to 600 nm is remarkably improved over that attained by a perylene compound alone dispersed in the resin in the same amount as used above. From this, it is considered that the perylene compound not only functions as a photoconductor, but also has the ability of exciting phthalocyanine molecules through an absorbed light energy. More particularly, the light energy absorbed in the perylene compound excites phthalocyanine molecules thereby causing the phthalocyanine having no ability of light absorption in a visible range to generate charges. This results in an increase in the spectral sensitivity to light with a wavelength of from 400 to 600 nm.

In addition, a reverse effect as set out above appears only slightly with respect to light within a wavelength range of from 600 to 800 to which X-type metal-free phthalocyanine exhibits high sensitivity. That is, the perylene compound used is excited by the light energy absorbed by the phthalocyanine and generates charges, thus exhibiting better sensitivity in the range of 600 to 800 nm.

The perylene compounds useful in the present invention include, for example, compounds of the following formulae (IV) and (V)

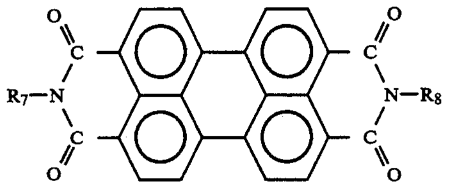

(IV)

wherein $R_7$ and $R_8$ independently represent an alkyl or alkoxy group having from 1 to 6 carbon atoms,

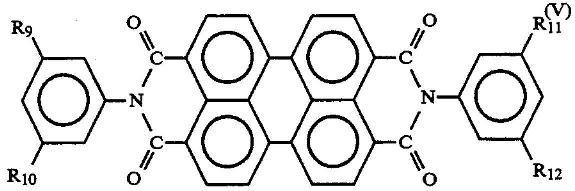

(V)

wherein $R_9$, $R_{10}$, $R_{11}$ and $R_{12}$ independently represent an alkyl alkoxy group having from 1 to 6 carbon atoms.

The alkyl group represented by $R_7$ to $R_{12}$ in the above formulae is, for example, methyl, ethyl, propyl, butyl, pentyl, hexyl or the like. The alkoxy group includes methoxy,ethoxy, propoxy, butoxy, pentoxy, hexoxy or the like.

These compounds are added in an amount of from 0.1 to 30 wt %, preferably from 1 to 10 wt %, based on X-type metal-free phthalocyanine. A greater amount is not favorable because the attenuation rate in the dark will become worsened. If the amount is less than the above range, a significant effect may not develop.

In view of affinity for the perylene compound and adhesion to a metal support, the binder resin should preferably have an aromatic group in the structure thereof. Moreover, at least one heat or light curable resin as defined hereinbefore is preferably used as part or all of the binder resin to improve thermal stability, humidity resistance and the like.

A twelfth embodiment of the invention is described wherein an amine derivative is used as the essential additive. By this, the resultant photosensitive material is improved in response and stability characteristics.

The amine derivatives useful in the present invention are of the following formulae (VI) and (VII)

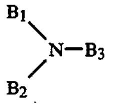

(VI)

wherein $B_1$ to $B_3$ independently represent an unsubstituted or substituted aromatic ring and aromatic heterocyclic ring

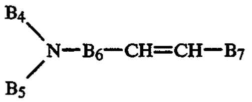

(VII)

wherein $B_4$ and $B_5$ independently represent an aromatic ring, $B_6$ represents an unsubstituted or substituted arylene group, and $B_7$ represents an unsubstituted or substituted aryl group, furyl group or thienyl group wherein if present, the substituent is an alkyl group, an alkoxy group, an aryloxy group, a hydroxyl group or a halogen.

The aromatic ring represented by $B_1$ to $B_5$ includes aryl groups such as phenyl, tolyl, xylyl, biphenyl, naphtyl and the like, and aralkyl groups such as benzyl, methyl benzyl, phenylethyl, napthylmethyl and the like. The arylene group represented by $B_6$ includes, for example, phenylene, methylphenylene and the like. The aryl group represented by $B_7$ is one defined with respect to $B_1$ to $B_5$. The alkyl and alkoxy groups as the substituent are low alkyl and alkoxy groups. Examples of the aryloxy group include a phenoxyl group.

Specific and preferred examples of the amine derivative (VI) are of the following formula (VIII)

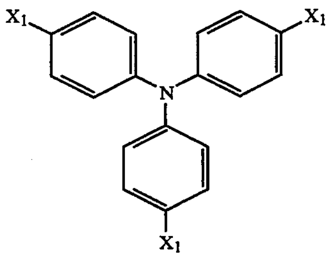

(VIII)

wherein $X_1$'s independently represent $CH_3$ or $OCH_3$.

Similarly, specific and preferred examples of the amine derivative (VII) are of the following formula (IX)

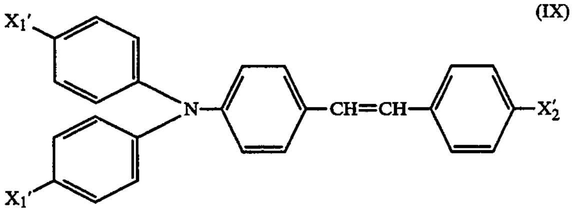

(IX)

wherein each $X_1'$ represents $CH_3$ and $X_2'$ represents $CH_3$ or $OCH_3$.

These derivatives are added in an amount of from 1 to 50 wt % based on X-type metal-free phthalocyanine.

The material to which the amine derivative is added has improved response and stability characteristics.

A thirteenth embodiment of the invention is described wherein amino compounds are used as the essential additive. By this, the resultant photosensitive material is improved in response and stability characteristics.

The amino compounds useful in the present invention includes monoamines such as alkylamines, phenylamines, alkylphenylamines, diamines, hydroxyquinolines, imidazoles, indoles, phenothiazines, carbazoles, aminocarboxylic acids, amido acids, triazoles and the like. Specific and preferred examples include p-phenylenediamine, N-diphenylacetamide, 6-ethoxy-2,2,4-trimethyl-1,2-dihydroxyquinone, 2-methylcaptobenzimidazole, 3-methylindole, phenothiazine, 3-phenylcarbazole and the like.

These amino compounds are added in an amount of from 1 to 50 wt % based on X-type metal-free phthalocyanine.

A fourteenth embodiment of the invention is directed to a photosensitive material which makes use of zinc oxide powder dispersed in the combination of X-type metal-free phthalocyanine and a binder resin.

The photosensitive material using zinc oxide as the essential additive is significantly improved in printing resistance and photosensitive characteristics and can be applied not only to laser printers, but also general-purpose inexpensive duplicators.

Zinc oxide powder used in this embodiment should preferably have a size of from 5 to 50 μm in order to ensure uniform dispersion in a binder resin and X-type metal-free phthalocyanine.

The powder is used in an amount of from 1 to 50 wt %, preferably from 5 to 20 wt %, based on X-type metal-free phthalocyanine.

The single-layer structure may be formed on a conductive support as set out hereinbefore either by dispersing X-type metal-free phthalocyanine, a binder resin and zinc oxide powder in a solvent as set forth before at the same time until the phthalocyanine is dispersed partly in a molecular state and partly in a particulate state, followed by the coating and drying procedures.

Alternatively, X-type metal-free phthalocyanine and a binder resin are dispersed or dissolved in a solvent so that the phthalocyanine is dispersed partly in a molecular state and partly in a particulate state. Subsequently, zinc oxide powder is added to the resultant dispersion.

The reason why zinc oxide powder is useful in improving the photosensitive material using X-type metal-free phthalocyanine over a number of inorganic powders is considered as follows. Zinc oxide is known as a photoconductor of the n type which absorbs light in a wavelength range of 400 to 500 nm. It is considered that zinc oxide used in combination with the phthalocyanine does not function as a photoconductor but acts to excite phthalocyanine molecules through absorption of a light energy in the zinc oxide powder. The excitation of phthalocyanine molecules is considered to take place efficiently when using zinc oxide. Accordingly, the excited phthalocyanine which has not inherent light absorption in a visible spectral range is caused to generate charges, resulting in an increase of photosensitivity to white light.

The zinc oxide powder used in the present invention may be one which is prepared by ordinary French and American processes. Preferably, the powder should be sensitized with dyes such as Rose Bengale, cyanine dyes and the like in a manner as is known in the art.

By the addition of zinc oxide powder, the resultant photosensitive material is sensitized particularly in a wavelength of from 400 to 550 nm. This enables one to employ ordinary, inexpensive duplicators and recording apparatus such as laser printers.

A fifteenth embodiment of the invention is described in which oxadiazole compounds are added as the essential additive.

The oxadiazole compounds useful in the present invention are of the following general formula (X)

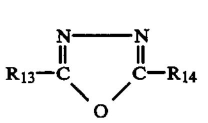

(X)

wherein $R_{13}$ and $R_{14}$ independently represent hydrogen, a halogen, a lower alkyl group, an aryl group, a lower alkoxy group, an aralkyl group, an amino group, a vinyl group or a hydroxyl group. The halogen may be chlorine, bromine or iodine. The lower alkyl and alkoxy groups have each 1 to 6 carbon atoms such as methyl, ethyl, propyl, butyl, pentyl, hexyl and the like, methoxy, ethoxy, propoxy, propoxy, butoxy, pentoxy, hexoxy and the like. The aryl and aralkyl groups may be phenyl, tolyl, xylyl, biphenyl, naphthyl and the like with or without a substituent such as an alkyl group, and benzyl, phenylethyl, methylbenzyl, naphthylmethyl, and the like. The amino group may be dimethylamino, diethylamino or the like.

Preferable examples include 2-(4-biphenylyl)-5-(4-tert-butylphenyl)-1,3,4-oxadiazole and the like.

The oxadiazole compound is added in an amount of from 1 to 50 wt % based X-type metal-free phthalocyanine used.

The addition of the compound of this embodiment contributes to improving photosensitive and charging characteristics and durability of the resultant photosensitive material.

A number of embodiments according to the invention have been described and the invention is more particularly described by way of examples. Comparative examples are also shown.

EXAMPLE 1

An electrolytically polymerized material was prepared by polymerizing pyrrole monomer in a propylene carbonate solution containing sodium toluenesulfonate electrolyte in an amount of 10 wt %. The resultant product formed on an anode was divided into fine pieces.

X-type metal-free phthalocyanine (Fastogen Blue 8120B, made by Dainippon Inks Co., Ltd.) and polyester resin were dissolved in tetrahydrofuran at a ratio by weight of 1:4. The fine pieces were added to the resultant solution in an amount of 10 wt % based on the X-type phthalocyanine, followed by further dispersion until the phthalocyanine was dispersed partly in a molecular state and partly in a particulate state. This was confirmed through an abrupt increase in the viscosity of the solution.

For comparison, the above procedure was repeated except that the fine pieces of the electrolytically oligomerized product were not added, thereby obtaining a solution.

Each solution was applied onto an aluminium substrate and dried to obtain a 12 μm thick photoconductive single layer.

The thus obtained photosensitive materials were each subjected to measurement of photosensitivity by the use of Paper Analyzer Model EPA-8100, made by Kawaguchi Denki K. K., in which white light with a wavelength of 780 nm was irradiated on the material to measure a photosensitivity by positive charge (half-life exposure, $E_{\frac{1}{2}}$) and also photosensitive characteristics after a first exposure cycle and at 1000th, 5000th and 10000th exposure cycles. The results are shown in Table 1. The half-life exposure, $E_{\frac{1}{2}}$, means an exposure (μJ/cm²) necessary for a surface potential being reduced to half when a sample is exposed to light with a wavelength of 780 nm at 5 μW/cm². When using white light for the exposure, the half-life exposure is expressed in terms of lux.second.

TABLE 1

| Exposure Cycles | 1 | 1,000 | 5,000 | 10,000 |
|---|---|---|---|---|
| Photosensitive Material of Invention: | | | | |
| Charge potential Vo (V) | 710 | 705 | 705 | 690 |
| Residual potential Vr (V) | 20 | 17 | 15 | 15 |
| Photosensitivity $E_{\frac{1}{2}}$ μJ/cm² | 1.1 | 1.0 | 1.0 | 1.0 |
| Photosensitive Material For Comparison: | | | | |
| Charge potential Vo (V) | 710 | 690 | 680 | 665 |
| Residual potential Vr (V) | 25 | 28 | 30 | 30 |
| Photosensitivity $E_{\frac{1}{2}}$ μJ/cm² | 1.5 | 1.4 | 1.4 | 1.4 |

As will be apparent from the above results, the photosensitive characteristics are significantly improved with better stability.

EXAMPLE 2

In a manner similar to Example 1, polythiophene was prepared using sodium triisopropylnaphthalenesulfonate as an anion.

X-type metal-free phthalocyanine and a polycarbonate were dispersed or dissolved in tetrahydrofuran at a ratio by weight of 1:5 until the phthalocyanine was dispersed partly in a molecular state and partly in a particulate state.

Fine pieces obtained from the polythiophene were added to the dispersion in an amount of 30 wt % based on the X-type phthalocyanine. The resultant dispersion was applied onto an aluminum substrate in a dry thickness of approximately 20 μm and dried. The resultant photosensitive material was subjected to measurements in the same manner as in Example 1. The results are shown in Table 2.

TABLE 2

| Exposure Cycles | 1 | 1,000 | 5,000 | 10,000 |
|---|---|---|---|---|
| Photosensitive Material of Invention: | | | | |
| Charge potential Vo (V) | 690 | 685 | 680 | 670 |
| Residual potential Vr (V) | 15 | 12 | 10 | 10 |
| Photosensitivity $E_{\frac{1}{2}}$ μJ/cm² | 1.1 | 1.0 | 1.0 | 0.95 |

The above results reveal that the photosensitivity and the stability in repeated use are improved by addition of the polythiophene.

EXAMPLE 3

In the same manner as in Example 1, fine pieces of polypyrrole were obtained.

X-type metal-free phthalocyanine and polybutyral were dispersed or dissolved in cyclohexanone at a mixing ratio by weight of 1:4. The fine pieces were added to the dispersion in an amount of 10 wt % based on the phthalocyanine, followed by sufficient dispersion.

The resultant dispersion was applied onto an Al substrate in a dry thickness of 0.5 μm to form a charge generation layer.

Thereafter, p-diethylaminobenzaldehyde (diphenylhydrazone) and a binder resin were dissolved in dichloromethane at a ratio by weight of 1:1. The resultant solution was applied onto the charge generation layer and dried to form a charge transport layer in a dry thickness of 20 μm.

For comparison, the charge generation layer was formed in the same manner as set forth above, except that any electrolytically polymerized product was not added.

Each photosensitive material was subjected to measurements in the same manner as in Example 1. The results are shown in Table 3.

TABLE 3

| Exposure Cycles | 1 | 1,000 | 5,000 | 10,000 |
|---|---|---|---|---|
| Photosensitive Material of Invention: | | | | |
| Charge potential Vo (V) | 780 | 770 | 750 | 730 |
| Residual potential Vr (V) | 35 | 40 | 40 | 45 |
| Photosensitivity $E_{\frac{1}{2}}$ μJ/cm² | 0.55 | 0.5 | 0.5 | 0.5 |
| Photosensitive Material For Comparison: | | | | |
| Charge potential Vo (V) | 780 | 760 | 720 | 710 |
| Residual potential Vr (V) | 50 | 60 | 75 | 80 |
| Photosensitivity $E_{\frac{1}{2}}$ μJ/cm² | 0.7 | 0.7 | 0.7 | 0.8 |

As will be apparent from the above results, the photosensitive characteristics are significantly improved and the residual potential is not increased with better stability when the polypyrrole is added.

EXAMPLE 4

In a manner similar to Example 1, polythiophene was prepared using sodium triisopropylnaphthalenesulfonate as an anion.

The general procedure of Example 3 was repeated except that the polythiophene was added in an amount of 30 wt % based on a charge generating agent and τ-type Cu phthalocyanine was provided as a charge generating agent, thereby obtaining a photosensitive material. The material was similarly tested, with the results shown in Table 4.

TABLE 4

| Exposure Cycles | 1 | 1,000 | 5,000 | 10,000 |
|---|---|---|---|---|
| Photosensitive Material of Invention: | | | | |
| Charge potential Vo (V) | 770 | 765 | 760 | 750 |
| Residual potential Vr (V) | 30 | 33 | 35 | 35 |
| Photosensitivity $E_{\frac{1}{2}}$ μJ/cm² | 0.5 | 0.5 | 0.45 | 0.45 |

The above results reveal that the photosensitivity and the stability in repeated use are improved by addition of the polythiophene.

Moreover, it was confirmed that similar results as in Examples 3 and 4 were obtained when using five-membered heterocylic polymers or oligomers with recurring units of the following formula as a monomer for electrolytic polymerization

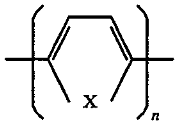

wherein X is N, S or O and n is an integer of 3 or over.

EXAMPLE 5

X-type metal-free phthalocyanine and polyvinyl butyral were dispersed in tetrahydrofuran and applied onto an Al substrate, followed by drying to form a 0.5 μm thick charge generation layer.

In the same manner as in Example 1, fine pieces of polypyrrole were obtained. 1-Phenyl-1,2,3,4-tetrahydroquilonlin-6-carboxyaldehyde-1',1'-diphenylhydrazone provided as a charge transport agent and a polycarbonate binder resin were dissolved in dichloromethane at a mixing ratio by weight of 2:3. Thereafter, the fine pieces were added to the solution in an amount of 10 wt % based on the hydrazone compound, followed by dispersion. The resultant solution was applied onto the charge generation layer to form a charge transport layer in a thickness of 20 μm.

For comparison, the above procedure was repeated except that the fine pieces of the polypyrrole were not added to the charge transport layer, thereby obtaining a photosensitive material.

Each photosensitive material were subjected to measurements in the same manner as in Example 1, with the results shown in Table 5.

TABLE 5

| Exposure Cycles | 1 | 1,000 | 5,000 | 10,000 |
|---|---|---|---|---|
| Photosensitive Material of Invention: | | | | |
| Charge potential Vo (V) | 770 | 765 | 760 | 760 |
| Residual potential Vr (V) | 20 | 15 | 15 | 15 |
| Photosensitivity $E_{\frac{1}{2}}$ μJ/cm$^2$ | 1.2 | 1.1 | 1.1 | 1.1 |
| Photosensitive Material For Comparison: | | | | |
| Charge potential Vo (V) | 780 | 775 | 775 | 775 |
| Residual potential Vr (V) | 20 | 25 | 30 | 30 |
| Photosensitivity $E_{\frac{1}{2}}$ μJ/cm$^2$ | 1.8 | 1.7 | 1.7 | 1.7 |

As will be apparent from the above results, the addition of polypyrrole can significantly improve the photosensitivity and stability in repeated use.

EXAMPLE 6

In the same manner as in Example 5, a charge generation layer made of a perylene pigment and polyvinyl butyral was formed on an Al substrate in a thickness of 0.2 μm.

Polythiophene was prepared using sodium triisopropylnaphthalenesulfonate as an anion. A polycarbonate resin and triphenylmethane were dispersed in the same manner as in Example 5, to which 30 wt % of the polythiophene was added. The resultant solution was applied onto the charge generation layer to form a charge transport layer in a dry thickness of 20 μm, thereby obtaining a photosensitive material.

For comparison, the above procedure was repeated except that the polythiophene was not added to the charge transport layer, thereby obtain a photosensitive material.

Each material was tested in the same manner as in the foregoing examples, with the results shown in Table 6 below.

TABLE 6

| Exposure Cycles | 1 | 1,000 | 5,000 | 10,000 |
|---|---|---|---|---|
| Photosensitive Material of Invention: | | | | |
| Charge potential Vo (V) | 650 | 655 | 655 | 655 |
| Residual potential Vr (V) | 20 | 20 | 25 | 25 |
| Photosensitivity $E_{\frac{1}{2}}$ μJ/cm$^2$ | 1.7 | 1.6 | 1.6 | 1.6 |
| Photosensitive Material For Comparison: | | | | |
| Charge potential Vo (V) | 670 | 675 | 675 | 680 |
| Residual potential Vr (V) | 20 | 25 | 30 | 30 |
| Photosensitivity $E_{\frac{1}{2}}$ μJ/cm$^2$ | 2.3 | 2.5 | 2.5 | 2.7 |

The results of the above table reveal that the addition of polythiophene contributes to improving the photosensitivity and the stability with little degradation in the repeated exposure test.

EXAMPLE 7

A polyester resin (RV200, available from Toyobo Ltd.) and X-type metal-free phthalocyanine were dispersed in cyclohexanone at a mixing ratio by weight of 4:1 to obtain a dispersion. 0.5 moles of a dye of the following formula per mole of X-type metal-free phthalocyanine was added to the dispersion, followed by sufficient dispersion.

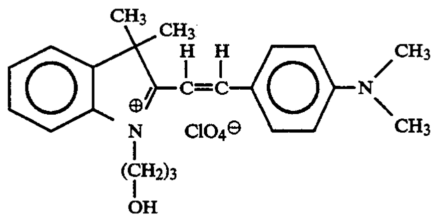

light absorption peak wavelength: 550 nm

The resultant solution was applied onto an Al substrate in a dry thickness of 20 μm to obtain a photosensitive material.

For comparison, the above procedure was repeated without use of the dye.

Each sample was subjected to measurements for initial charge potential, $V_o$ and photosensitivity, $E_{\frac{1}{2}}$, in the same manner as in the foregoing examples. The results are shown in Table 7. In addition, these characteristics were also measured under different temperature and humidity conditions of 5° C. and 20 R.H. %, 20° C. and 50 R.H. %, and 35° C. and 85 R.H. % with the results shown in Table 8.

TABLE 7

| Exposure Cycles | 1 | 1,000 | 5,000 | 10,000 |
|---|---|---|---|---|
| Photosensitive Material of Invention: | | | | |
| Charge potential Vo (V) | 780 | 770 | 765 | 760 |
| Photosensitivity $E_{\frac{1}{2}}$ μJ/cm$^2$ | 1.8 | 1.7 | 1.7 | 1.7 |
| Photosensitive Material For Comparison: | | | | |
| Charge potential Vo (V) | 780 | 760 | 750 | 740 |
| Photosensitivity $E_{\frac{1}{2}}$ μJ/cm$^2$ | 2.1 | 1.9 | 1.8 | 1.7 |

TABLE 8

| Environmental Conditions | 5° C., 20 R.H. % | 20° C., 50 R.H. % | 35° C., 85 R.H. % |
|---|---|---|---|
| Photosensitive Material of Invention: | | | |
| Charge potential Vo (V) | 800 | 780 | 770 |
| Photosensitivity $E_{\frac{1}{2}}$ μJ/cm$^2$ | 1.9 | 1.8 | 1.8 |
| Photosensitive Material For Comparison: | | | |
| Charge potential Vo (V) | 820 | 780 | 730 |
| Photosensitivity $E_{\frac{1}{2}}$ μJ/cm$^2$ | 2.3 | 2.1 | 2.5 |

The results of Tables 7 and 8 reveal that the material of the invention is Improved in photosensitivity and stability in repeated use. In addition, the photosensitive characteristics under different temperature and humidity conditions are less varied than those of the material for comparison.

EXAMPLE 8

X-type metal-free phthalocyanine and polycarbonate resin (available Mitsubishi Gas Chem. Co.,Ltd.) were dispersed in cyclohexanone at a mixing ratio by weight of 1:5. 0.1 mole of a dye of the following formula per mole of X-type phthalocyanine was added to the solution. Then, the procedure of Example 7 was repeated to obtain a photosensitive material.

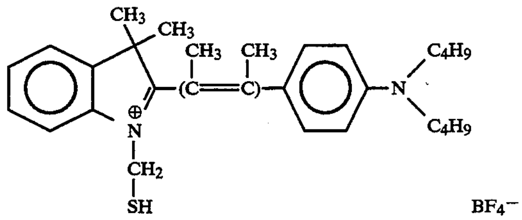

light absorption peak wavelength: 620 nm

For comparison, the above procedure was repeated without use of the dye, thereby obtaining a photosensitive material.

Each material was tested in the same as in the foregoing examples. The results are shown in Table 9 below.

TABLE 9

| Exposure Cycles | 1 | 1,000 | 5,000 | 10,000 |
|---|---|---|---|---|
| Photosensitive Material of Invention: | | | | |
| Charge potential Vo (V) | 750 | 740 | 735 | 735 |
| Photosensitivity $E_{\frac{1}{2}}$ $\mu J/cm^2$ | 2.2 | 2.1 | 2.1 | 2.1 |
| Photosensitive Material For Comparison: | | | | |
| Charge potential Vo (V) | 760 | 730 | 720 | 710 |
| Photosensitivity $E_{\frac{1}{2}}$ $J/cm^2$ | 2.6 | 2.3 | 2.2 | 2.1 |

A photosensitive drum for Laser Printer L-136 (Panasonic) was made using the photosensitive material of the invention. The laser printer was subjected to a printing test with good quality images. No change was observed in the drum when 50,000 printing cycles were performed.

EXAMPLE 9

10 parts by weight X-type metal-free phthalocyanine was immersed in a solution of 0.05% phenyltrimethoxysilane used as a silane coupling agent in methanol, followed by drying to a satisfactory extent. The thus dried phthalocyanine was dispersed in tetrahydrofuran along with 50 parts by weight of polycarbonate for a time sufficient for partial dissolution of the phthalocyanine.

The photosensitive solution was coated onto an aluminum sheet by means of a spinner, and dried at 120° C. for 5 hours to form a photosensitive single layer with a thickness of 8 $\mu$m.

For comparison, the above procedure was repeated without use of the silane coupling agent, thereby obtaining a photosensitive material.

These photosensitive materials were each tested in the same manner as in the foregoing examples to determine initial characteristics and those characteristics after 5000 exposure cycles.

EXAMPLE 10

The general procedure of Example 9 was repeated except that methyldimethoxysilane (Toray Silicone Co., Ltd.) was dissolved in ethanol at a concentration of 0.1%, thereby obtaining a photosensitive materials whose layer thickness was 7 $\mu$m. The photosensitive material was tested in the same manner as in Example 9.

EXAMPLE 11

10 parts by weight of X-type phthalocyanine was treated with a 0.1% vinyltrimethoxysilane (Toray Silicone Co.. Ltd.) solution in methanol and dried. 50 parts by weight of a mixture of polycarbonate and polyvinyl butyral at a ratio by weight of 2:1 was dissolved in tetrahydrofuran along with the phthalocyanine, followed by sufficient dispersion. The resultant solution was applied in the same manner as in Example 9 to obtain a photosensitive material with a photosensitive layer thickness of 9 $\mu$m. A similar test as in Example 9 was conducted on this material.

The results of Examples 9 to 11 are shown in Table 10 below along with the results for comparison.

TABLE 10

| | Initial | | 5000 | |
|---|---|---|---|---|
| | Charge Potential Vo (V) | Photo-sensitivity $E_{\frac{1}{2}}$ (lux · sec) | Charge Potential Vo (V) | Photo-sensitivity $E_{\frac{1}{2}}$ (lux · sec) |
| Example 9 | 400 | 3.2 | 390 | 3.0 |
| Example 10 | 410 | 3.1 | 390 | 2.0 |
| Example 11 | 400 | 3.6 | 390 | 3.5 |
| Comparison | 390 | 3.4 | 260 | 2.9 |

EXAMPLE 12

X-type metal-free phthalocyanine, a polysilane compound having recurring units of the following formula, and polystyrene (18242-7, available from Aldrich Co., Ltd.) were dissolved in tetrahydrofuran at mixing ratios of 10:1:40, followed by dispersion by ball milling.

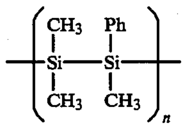

in which n is an integer of 5 or over.

The resultant solution was applied onto an Al sheet by dipping to form a photosensitive layer in a thickness of 20 $\mu$m.

For comparison, the above procedure was repeated without use of the polysilane compound, thereby obtaining a photosensitive material.

These materials were each subjected to measurements in the same manner in Example 7 to determine values of $V_o$ and $E_{\frac{1}{2}}$ at the first, 1000th, 5000th and 10,000th exposure cycles and under different temperature and humidity conditions.

The results are shown in Tables 11 and 12.

TABLE 11

| Exposure Cycles | 1 | 1,000 | 5,000 | 10,000 |
|---|---|---|---|---|
| Photosensitive Material of Invention: | | | | |
| Charge potential Vo (V) | 780 | 770 | 765 | 760 |
| Photosensitivity $E_{\frac{1}{2}}$ $\mu J/cm^2$ | 1.8 | 1.7 | 1.7 | 1.7 |
| Photosensitive Material For Comparison: | | | | |

TABLE 11-continued

| Exposure Cycles | 1 | 1,000 | 5,000 | 10,000 |
|---|---|---|---|---|
| Charge potential Vo (V) | 780 | 760 | 750 | 740 |
| Photosensitivity $E_{1/2}$ μJ/cm² | 2.1 | 1.9 | 1.8 | 1.7 |

TABLE 12

| Environmental Conditions | 5° C., 20 R.H. % | 20° C., 50 R.H. % | 35° C., 85 R.H. % |
|---|---|---|---|
| Photosensitive Material of Invention: | | | |
| Charge potential Vo (V) | 800 | 780 | 770 |
| Photosensitivity $E_{1/2}$ μJ/cm² | 1.9 | 1.8 | 1.8 |
| Photosensitive Material For Comparison: | | | |
| Charge potential Vo (V) | 820 | 780 | 730 |
| Photosensitivity $E_{1/2}$ μJ/cm² | 2.3 | 2.1 | 2.5 |

EXAMPLE 13

X-type metal-free phthalocyanine, a polysilane compound having recurring units of the following formula, and polyester (Vylon 2000, available from Toyobo Ltd.) were dissolved in tetrahydrofuran at mixing ratios of 10:0.5:40, followed by dispersion by ball milling.

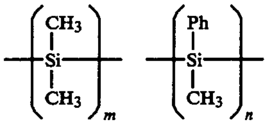

in which m and n are, respectively, an integer of 5 or over.

The resultant solution was applied onto an Al sheet by dipping to form a photosensitive layer in a thickness of 18 μm.

For comparison, the above procedure was repeated without use of the polysilane compound, thereby obtaining a photosensitive material.

These materials were each subjected to measurements in the same manner in Example 12 to determine values of $V_o$ and $E_{178}$ at the first, 1000th, 5000th and 10,000th exposure cycles.

TABLE 13

| Exposure Cycles | 1 | 1,000 | 5,000 | 10,000 |
|---|---|---|---|---|
| Photosensitive Material of Invention: | | | | |
| Charge potential $V_o$ (V) | 750 | 740 | 735 | 735 |
| Photosensitivity $E_{1/2}$ μJ/cm² | 2.2 | 2.1 | 2.1 | 2.1 |
| Photosensitive Material For Comparison: | | | | |
| Charge potential $V_o$ (V) | 760 | 730 | 720 | 710 |
| Photosensitivity $E_{1/2}$ μJ/cm² | 2.6 | 2.3 | 2.2 | 2.1 |

EXAMPLE 14

X-type metal-free phthalocyanine, a polysilane compound as used in Example 13, and a bromine and OH group-bearing aromatic polymer (FOC-10, available from Fuji Pharm. Co., Ltd.) were dissolved in tetrahydrofuran at mixing ratios by weight of 10:1:50, followed by ball milling for sufficient dispersion. The resultant solution was applied onto an Al substrate and dried to form a 18 μm thick photosensitive layer.

For comparison, the above procedure was repeated without use of the polysilane compound, thereby obtaining a photosensitive material.

These materials were tested in the same manner as in Example 12. The results are shown in Table 14 below.

TABLE 14

| Exposure Cycles | 1 | 1,000 | 5,000 | 10,000 |
|---|---|---|---|---|
| Photosensitive Material of Invention: | | | | |
| Charge potential $V_o$ (V) | 770 | 760 | 755 | 750 |
| Photosensitivity $E_{1/2}$ μJ/cm² | 1.7 | 1.6 | 1.6 | 1.6 |
| Photosensitive Material For Comparison: | | | | |
| Charge potential $V_o$ (V) | 770 | 750 | 740 | 730 |
| Photosensitivity $E_{1/2}$ μJ/cm² | 2.0 | 1.9 | 1.8 | 1.6 |

EXAMPLE 15

X-type metal-free phthalocyanine, a polysilane compound as used in Example 12, polyester resin (Vylon 200) and a thermosetting resin (FDER, available from Fuji Pharm. Co., Ltd.) were dissolved in tetrahydrofuran at mixing ratios by weight of 10:0.3:5:35, followed by ball milling for sufficient dispersion. The resultant solution was applied onto an aluminum sheet by dipping and dried at a temperature of 150° C. for 2 hours, followed by curing to form a 18 μm thick photosensitive layer.

For comparison, the above procedure was repeated without use of the polysilane compound, thereby obtaining a photosensitive material.

These materials were tested in the same manner as in Example 12. The results are shown in table 15 below.

TABLE 15

| Exposure Cycles | 1 | 1,000 | 5,000 | 10,000 |
|---|---|---|---|---|
| Photosensitive Material of Invention: | | | | |
| Charge potential $V_o$ (V) | 760 | 752 | 748 | 745 |
| Photosensitivity $E_{1/2}$ μJ/cm² | 2.3 | 2.2 | 2.2 | 2.2 |
| Photosensitive Material For Comparison: | | | | |
| Charge potential $V_o$ (V) | 770 | 745 | 730 | 720 |
| Photosensitivity $E_{1/2}$ μJ/cm² | 2.7 | 2.4 | 2.3 | 2.2 |

As will be apparent from the results of Examples 12 to 15 and for comparison, the addition of the polysilane compounds contributes to improving the photosensitivity and the stability in repeated use. The variation in the photosensitive characteristics under different environmental conditions is small for the photosensitive materials of the invention.

Photosensitive drums for Laser Printer L-136 (Panasonic) was made using the photosensitive materials of Examples 12 to 15. The laser printer was subjected to a printing test with good quality images. No change was observed in the respective drums when 50,000 prints were made.

EXAMPLE 16

X-type metal-free phthalocyanine and polyester resin (Vylon 200) were dissolved in tetrahydrofuran at a ratio by weight of 1:4. A hole transport substance of the following formula

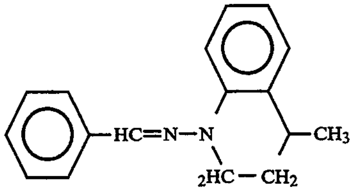

and an electron transport substance of the following formula

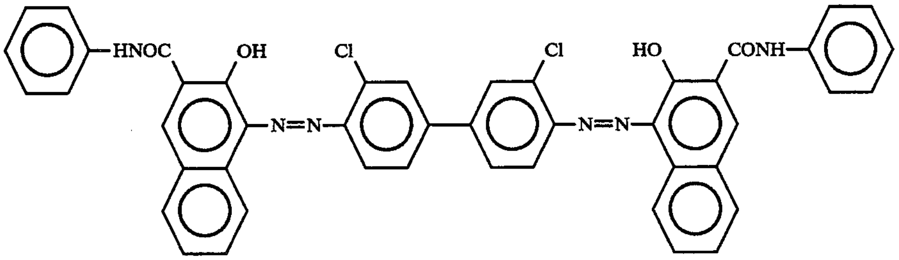

were, respectively, added to the solution in amounts of five times the amount of X-type phthalocyanine and $\frac{1}{4}$ of the amount of X-type phthalocyanine, followed by sufficient dispersion under agitation. The resultant solution was applied onto an aluminum sheet by dipping and allowed to stand at 120° C. for 1 hour for drying to obtain a photosensitive material.

EXAMPLE 17

X-type metal-free phthalocyanine and polyester resin (Vylon 200) were dissolved in tetrahydrofuran at a ratio by weight of 1:4. A hole transport substance of the following formula

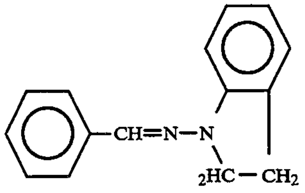

and an electron transport substance of the following formula

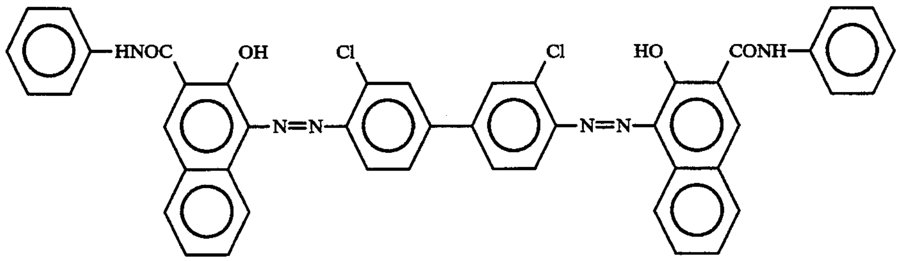

were, respectively, added to the solution in amounts of five times the amount of X-type phthalocyanine and $\frac{1}{4}$ of the amount of X-type phthalocyanine, followed by sufficient dispersion under agitation. The resultant solution was applied onto an aluminum sheet by dipping and allowed to stand at 120° C. for 1 hour for drying to obtain a photosensitive material.

For comparison, X-type metal-free phthalocyanine and polyester (Vylon 200) were dissolved in tetrahydrofuran at a ratio by weight of 1:4, followed by sufficient dispersion. The resultant solution was applied onto an Al sheet by dipping and dried by allowing to stand at 120° C. for one hour, thereby forming a photosensitive material.

The materials obtained in Examples 16, 17 and for comparison were subjected to measurement of a half-life exposure, $E_{\frac{1}{2}}$, by positive charge through irradiation of white light from tungsten by the use of Paper Analyzer EPA-8100. Moreover, a wavelength characteristic of the materials in the range of from 400 to 1000 nm was measured. The results are shown in FIGS. 3 and 4.

Figure 3:
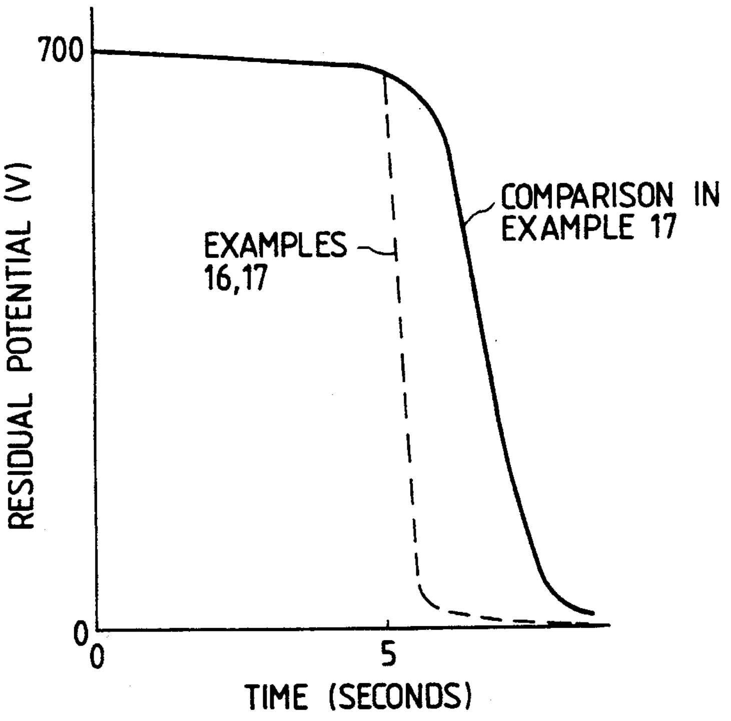
FIG. 3 is a curve showing a residual potential of positively charged photosensitive layers of the invention to which hole and electron transport materials are added, respectively, and a positively charged photosensitive layer for comparison.

FIG. 3 reveals that the photosensitive characteristic of Examples 16 and 17 using mixtures of the hole and electron transport substances is better than the photosensitive characteristic of the material for comparison.

Figure 4:
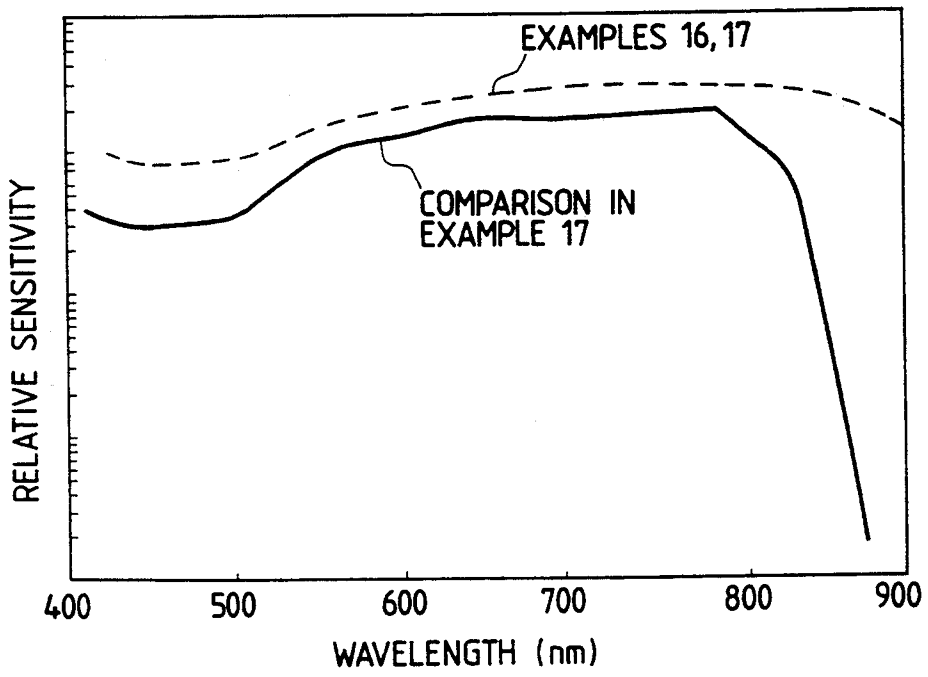
FIG. 4 is a photosensitivity curve of positively charged photosensitive layers of the invention to which hole and electron transport materials are added, respectively, and a positively charged photosensitive layer for comparison

FIG. 4 reveals that the photosensitivity of the materials obtained Examples 16 and 17 in a wavelength range over 800 nm is better than that of the comparative material using no charge generating and transporting substances.

EXAMPLE 18

Polyester resin (RV200 available from Toyobo Ltd.) and X-type metal-free phthalocyanine were dissolved in cyclohexanone at a ratio by weight of 4:1, to which a fluorine-containing graft polymer (GF3000, available from Toa Synthetic Co., Ltd.)) and/or an amino-modified silicone compound (SF8417, Toray Silicone Co., Ltd.) was added in amounts indicated in Table 16, followed by sufficient dispersion as in the foregoing examples. The resultant solution was applied onto an Al substrate to form a $18\mu$ thick photosensitive layer. In this manner, several photosensitive materials having different amounts of the graft polymer and silicone compound in the photosensitive layers were obtained.

The charge potential and photosensitivity, $E_{1/2}$, of the respective materials were measured under different environmental conditions. The results are shown in Table 16 below.

TABLE 16

| Environmental | 5° C., 20 R.H. % | | 20° C., 50 R.H. % | | 35° C., 85 R.H. % | |
|---|---|---|---|---|---|---|
| Conditions | $V_o$ | $E_{1/2}$ | $V_o$ | $E_{1/2}$ | $V_o$ | $E_{1/2}$ |
| Photosensitive Materials of Invention: | | | | | | |
| GF3000 1 wt % SF4817 0.2 wt % | 720 | 2.3 | 700 | 2.2 | 690 | 2.3 |
| GF3000 3 wt % SF4817 0.2 wt % | 725 | 2.5 | 700 | 2.4 | 690 | 2.4 |
| GF3000 1 wt % SF4817 1 wt % | 720 | 2.4 | 700 | 2.3 | 685 | 2.4 |
| Photosensitive Materials for Comparison: | | | | | | |
| GF3000 1 wt % SF4817 0 wt % | 750 | 2.8 | 700 | 2.6 | 670 | 2.3 |
| GF3000 0 wt % SF4817 1 wt % | 720 | 2.7 | 700 | 2.5 | 660 | 2.3 |
| GF3000 0 wt % SF4817 0 wt % | 730 | 2.6 | 700 | 2.3 | 650 | 2.0 |

As will be apparent from the above results, the addition of both the silicone compound and the fluorine-containing compound contributes to improving the environmental stability.

EXAMPLE 19

In the same manner as in Example 18, X-type metal-free phthalocyanine and polycarbonate resin were dissolved in cyclohexanone, to which GF3000 and a carboxy-modified silicone compound (SF4818) were added in different amounts. The resultant photosensitive materials were tested in the same manner as in Example 18. The results are shown in Table 17.

TABLE 17

| Environmental | 5° C., 20 R.H. % | | 20° C., 50 R.H. % | | 35° C., 85 R.H. % | |
|---|---|---|---|---|---|---|
| Conditions | $V_o$ | $E_{1/2}$ | $V_o$ | $E_{1/2}$ | $V_o$ | $E_{1/2}$ |
| Photosensitive Materials of Invention: | | | | | | |
| GF3000 0.2 wt % SF4818 0.2 wt % | 725 | 2.4 | 700 | 2.3 | 680 | 2.1 |
| GF3000 1 wt % SF4818 0.2 wt % | 725 | 2.7 | 705 | 2.4 | 690 | 2.3 |
| GF3000 3 wt % SF4818 1 wt % | 735 | 2.6 | 710 | 2.4 | 695 | 2.3 |
| GF3000 3 wt % SF4818 3 wt % | 730 | 2.6 | 720 | 2.4 | 700 | 2.3 |
| Photosensitive Materials for Comparison: | | | | | | |
| GF3000 0 wt % SF4818 1 wt % | 720 | 2.8 | 695 | 2.4 | 660 | 2.2 |
| GF3000 0 wt % SF4818 0 wt % | 730 | 2.6 | 700 | 2.3 | 650 | 2.0 |

EXAMPLE 20

Polyester resin (RV200) and X-type metal-free phthalocyanine were dissolved in cyclohexanone at a ratio by weight of 4:1, to which titanyl phthalocyanine was added in an amount of 0.1, 0.2 or 0.3 moles per mole of the X-type metal-free phthalocyanine, followed by sufficient dispersion. The respective solutions were applied onto an Al substrate in a dry thickness of 18 μm to obtain photosensitive materials.

For comparison, the above procedure was repeated without use of titanyl phthalocyanine.

Each material was tested to determine photosensitivities, $E_{1/2}$ and $E_{1/10}$ (an exposure necessary for a surface potential being reduced to one tenth) by the use of a wavelength for measurement. In addition, the photosensitive material wherein titanyl phthalocyanine was added in an amount of 0.2 moles per mole of X-type metal-free phthalocyanine was subjected to measurements of stability in repeated use and environmental stability. The results are shown in Tables 18, 19 and 20 below.

TABLE 18

| Amount of Titanyl Phthalocyanine | $E_{1/2}$ lux · sec. | $E_{1/16}$ lux · sec. |
|---|---|---|
| 0 mole | 2.3 | 4.8 |
| 0.1 mole | 2.1 | 4.1 |
| 0.2 moles | 1.8 | 3.2 |
| 0.3 moles | 1.6 | 2.4 |

TABLE 19

| | 1st cycle | 1000th cycle | 5000th cycle | 10000th cycle |
|---|---|---|---|---|
| 0.2 moles of titanyl phthalocyanine: | | | | |
| $V_o$ | 700 | 690 | 685 | 685 |
| $E_{1/2}$ | 1.8 | 1.7 | 1.7 | 1.65 |
| 0 mole for comparison: | | | | |
| $V_o$ | 700 | 685 | 670 | 665 |
| $E_{1/2}$ | 2.3 | 2.1 | 2.0 | 1.9 |

Initial charge potential (V), $E_{1/2}$: lux · second

TABLE 20

| Environmental | 5° C., 20 R.H. % | | 20° C., 50 R.H. % | | 35° C., 85 R.H. % | |
|---|---|---|---|---|---|---|
| Conditions | $V_o$ | $E_{1/2}$ | $V_o$ | $E_{1/2}$ | $V_o$ | $E_{1/2}$ |
| 0.2 moles of titanyl phthalocyanine | 715 | 1.9 | 700 | 1.8 | 690 | 1.7 |
| no titanyl phthalocyanine for comparison | 740 | 2.6 | 700 | 2.3 | 680 | 2.1 |

Vo: initial charge potential (V), $E_{1/2}$: lux · second

The results of Tables 18 to 20 reveal that the addition of titanyl phthalocyanine contributes to improving the sensitivity and the stability without the residual potential being increased. The photosensitivity suffers only a reduced variation under different environmental conditions.

EXAMPLE 21

X-type metal-free phthalocyanine and polycarbonate resin were dissolved in cyclohexanone at a ratio by weight of 1:5, to which vanadyl phthalocyanine was added in an amount of 0.3, 0.5 or 1 mole per mole of X-type metal-free phthalocyanine, thereby obtaining three solutions. Each solution was used to make a photosensitive material in the same manner as in Example 20. The material was tested in the same manner as in Example 20.

The results of the sensitivity are shown in Table 21 and similar results as in Example 20 are obtained with respect to the stability in repeated use and the environmental stability.

TABLE 21

| Amount of Titanyl Phthalocyanine | $E_{1/2}$ lux · sec. | $E_{1/10}$ lux · sec. |
|---|---|---|
| 0 mole | 2.3 | 4.8 |
| 0.1 mole | 2.2 | 4.5 |
| 0.3 moles | 1.8 | 3.3 |
| 0.5 moles | 1.7 | 2.9 |

The materials were used to make a photosensitive drum for Laser Printer L-136 (Panasonic). Each drum was subjected to a printing test with good-quality images. No change was observed after repetitions of 50,000 printing cycles.

EXAMPLE 22

X-type metal-free phthalocyanine and polyester resin (RV200) were dissolved in cyclohexanone at a ratio by weight of 1:4, to which 2,4,7-trinitro-9-fluorenone was added in an amount of 0.1 mole per mole of the phthalocyanine, followed by further sufficient dispersion. The resultant solution was applied onto an Al substrate in a dry thickness of 20 μm.

For comparison, the above procedure was repeated except that there was not used the charge acceptor.

Each material was tested in the same manner as in Example 15 to determine photosensitivity, $E_{1/2}$, and repeated stability at first, 1000th, 5000th and 10000th cycles.

The results are shown in Table 22 below.

TABLE 22

| | 1st cycle | 1000th cycle | 5000th cycle | 10000th cycle |
|---|---|---|---|---|
| | 0.1 mole of charge acceptor: | | | |
| $V_o$ (V) | 750 | 740 | 740 | 735 |
| $E_{1/2}$ (μJ/cm²) | 1.2 | 1.1 | 1.1 | 1.1 |
| | no charge acceptor for comparison: | | | |
| $V_o$ (V) | 750 | 735 | 730 | 720 |
| $E_{1/2}$ (μJ/cm²) | 1.8 | 1.7 | 1.7 | 1.6 |

As will be apparent from the above results, the addition of the trinitrofluorenone contributes to improving the sensitivity and stability without increasing the residual potential.

Similar results were obtained when the trinitrofluorenone was added in an amount ranging from 0.01 to 0.5 moles per mole of X-type phthalocyanine.

Moreover, the procedure of Example 22 was repeated using tetranitrofluoreneone instead of the trinitrofluorenone. As a result, it was found that similar results were obtained in an amount of tetranitrofluorenone ranging from 0.01 to 0.5 moles per mole of X-type phthalocyanine.

EXAMPLE 23

The general procedure of Example 22 was repeated except that there were used polycarbonate resin and tetracyanoquinodimethane as a charge acceptor and that the amount of the charge acceptor was 0.05 moles per mole of X-type phthalocyanine, thereby obtaining a photosensitive material. The material was tested in the same manner as in Example 22. The results are shown in Table 23.

TABLE 23

| | 1st cycle | 1000th cycle | 5000th cycle | 10000th cycle |
|---|---|---|---|---|
| | 0.05 mole of charge acceptor: | | | |
| $V_o$ (V) | 750 | 740 | 735 | 730 |
| $E_{1/2}$ (μJ/cm²) | 1.1 | 1.0 | 1.0 | 0.9 |

When tetracyanoquinodimethane was used in an amount of 0.01 to 0.5 moles per mole of X-type phthalocyanine, similar results were obtained.

These materials were used to make a photosensitive drum for Laser Printer L-136 (Panasonic). Each drum was subjected to a printing test with good-quality images. No change was observed after repetitions of 50,000 printing cycles.

In addition, when other types of polycyclic aromatic nitro charge acceptors were used, similar results as in Example 22 and 23 were obtained.

EXAMPLE 24

X-type metal-free phthalocyanine and polyester resin (RV200) were dissolved in cyclohexanone at a ratio by weight of 1:4, to which 0.2 moles of triphenylthiapyrylium perchlorate and 1 mole of 1,1-bis(4-N,N-diethylamino-2-methylphenyl)-1-phenylmethane were added, each per mole of X-type phthalocyanine, followed by further sufficient dispersion. The resultant solution was applied onto an Al substrate in a dry thickness of 20 μm.

For comparison, the above procedure was repeated except that there was not used the additive combination.

Each material was tested in the same manner as in Example 15 to determine photosensitivity, $E_{1/2}$, and repeated stability at first, 1000th, 5000th and 10000th cycles.

The results are shown in Table 24 below.

TABLE 24

| | 1st cycle | 1000th cycle | 5000th cycle | 10000th cycle |
|---|---|---|---|---|
| | Material using additives: | | | |
| $V_o$ (V) | 750 | 740 | 740 | 735 |
| $E_{1/2}$ (μJ/cm²) | 1.2 | 1.1 | 1.1 | 1.1 |
| | No Additive for comparison: | | | |
| $V_o$ (V) | 750 | 735 | 730 | 720 |
| $E_{1/2}$ (μJ/cm²) | 1.8 | 1.7 | 1.7 | 1.6 |

As will be apparent from the above results, the addition of the thiapyrylium dye and 1,1-bis(4-N,N-diethylamino-2-methylphenyl)-1-phenylmethane contributes to improving the sensitivity and stability without increasing the residual potential.

When the amount of 1,1-bis(4-N,N-diethylamino-2-methylphenyl)-1-phenylmethane was changed from 0.1 to 5 moles per mole of X-type phthalocyanine, similar results were obtained.

EXAMPLE 25

X-type metal-free phthalocyanine and polycarbonate resin were dissolved in cyclohexanone at a ratio by weight of 1:5, to which 1 mole of triphenylthiapyrylium perchlorate 2 moles of 1,1-bis(4-N,N-diethylamino-2-methylphenyl)-1-phenylmethane were added, each per mole of X-type phthalocyanine, thereby obtaining a solution. The solution was used to make a photosensitive material in the same manner as in Example 24. The material was tested in the same manner as in Example 24. The results are shown in Table 25.

TABLE 25

| | 1st cycle | 1000th cycle | 5000th cycle | 10000th cycle |
|---|---|---|---|---|
| Vo (V) | 750 | 740 | 735 | 730 |
| $E_{\frac{1}{2}}$ ($\mu J/cm^2$) | 1.1 | 1.0 | 1.0 | 0.9 |

Similar results as in Example 24 were obtained with respect to the sensitivity and stability.

When 1,1-bis(4-N,N-diethylamino-2-methylphenyl)-1-phenylmethanetetracyanoquinodimethane was used in an amount of 0.1 to 5 moles per mole of X-type phthalocyanine, similar results were obtained.

These materials were used to make a photosensitive drum for Laser Printer L-136 (Panasonic). Each drum was subjected to a printing test with good-quality images. No change was observed after repetitions of 50,000 printing cycles.

EXAMPLE 26

X-type metal-free phthalocyanine, a perylene compound of the following formula wherein $R_1$ and $R_2$ are, respectively, a methyl group, and polystyrene (18242-7, available from Aldrich Co., Ltd.) were dissolved in tetrahydrofuran at mixing ratios of 10:1:40, followed by sufficient dispersion by ball milling. The resultant solution was applied onto an Al substrate by dipping and dried to form a 10 μm thick photosensitive layer

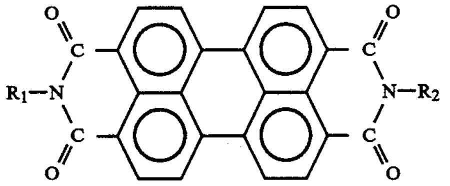

For comparison, the above procedure was repeated without use of the perylene compound, thereby obtaining a photosensitive material.

These materials were subjected to measurement of a spectral sensitivity characteristic, $E_{\frac{1}{2}}$, by positive charge at different wavelengths in the same manner as in the foregoing examples. The results are shown in Table 26.

TABLE 26

| Charge Potential (V) | Sensitivity ($\mu J/cm^2$) at different Wavelengths 400 nm | 500 nm | 600 nm | 700 nm |
|---|---|---|---|---|
| Material of Invention: 720 | 2.0 | 1.8 | 1.8 | 1.8 |
| Material for Comparison: 700 | 5.5 | 7.0 | 2.2 | 2.3 |

EXAMPLE 27

X-type metal-free phthalocyanine, a perylene compound of the following formula wherein $R_1$, $R_2$, $R_3$ and $R_4$ are, respectively, $-OCH_3$, and polyester (Vylon 200) were dissolved in tetrahydrofuran at mixing ratios of 10:0.5:40, followed by sufficient dispersion by ball milling. The resultant solution was applied onto an Al sheet by dipping to form a 15 μm thick photosensitive layer on the substrate.

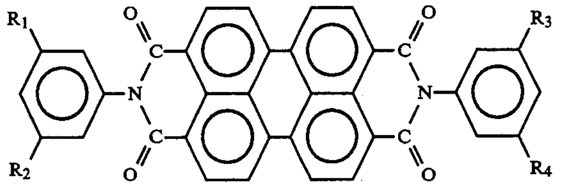

For comparison, the above procedure was repeated except that the perylene compound was not used, thereby obtaining a photosensitive material.

The materials were each tested in the same manner as in Example 26 to determine the spectral sensitivity characteristic. Also, a repeated exposure test was effected using light with a wavelength of 780 nm. The results are shown in Tables 27 and 28 below.

TABLE 27

| Charge Potential (V) | Sensitivity ($\mu J/cm^2$) at different Wavelengths 400 nm | 500 nm | 600 nm | 700 nm |
|---|---|---|---|---|
| Material of Invention: 650 | 1.8 | 1.6 | 1.5 | 1.5 |
| Material for Comparison: 600 | 6.0 | 5.5 | 1.8 | 1.6 |

TABLE 28

| | | at 10000th cycle | |
|---|---|---|---|
| Charge Potential (V) | Sensitivity ($\mu J/cm^2$) | Charge Potential (V) | Sensitivity ($\mu J/cm^2$) |
| Material of Invention: 650 | 1.8 | 630 | 1.6 |
| Material for Comparison: 600 | 1.7 | 610 | 1.8 |

EXAMPLE 28

X-type metal-free phthalocyanine, a perylene compound used in Example 27, and FOC10 used as a binder resin were dissolved in tetrahydrofuran at mixing ratios of 10:1:50, followed by sufficient dispersion by ball milling. The resultant solution was applied onto an Al substrate by dipping to form a 18 μm thick photosensitive layer.

For comparison, the above process was repeated without use of the perylene compound These materials were subjected to measurement of a spectral sensitivity characteristic, $E_{\frac{1}{2}}$, by positive charge at different wavelengths in the same manner as in the foregoing examples. The results are shown in Table 29.

TABLE 29

| Charge Potential (V) | Sensitivity ($\mu J/cm^2$) at different Wavelengths 400 nm | 500 nm | 600 nm | 700 nm |
|---|---|---|---|---|
| Material of Invention: 750 | 1.5 | 1.4 | 1.5 | 1.5 |
| Material for Comparison: 700 | 6.4 | 4.8 | 1.7 | 1.6 |

From the above results, it will be seen that the sensitivity of the material of the invention is better than that for comparison.

EXAMPLE 29

X-type metal-free phthalocyanine, a perylene compound used in Example 27, polyester (Vylon 200) and a thermosetting resin (FDER, available from Fuji Pharm. Co., Ltd.) were dissolved in tetrahydrofuran at mixing ratios of 10:0.3:5:35, followed by sufficient dispersion by ball milling. The resultant solution was applied onto an Al substrate by dipping and dried and cured at 150° C. for 2 hours to obtain a 18 $\mu m$ thick photosensitive layer.

For comparison, the above procedure was repeated except that the perylene compound was not added, thereby obtaining a photosensitive material.

These materials were subjected to measurement of a spectral sensitivity characteristic, $E_{\frac{1}{2}}$, by positive charge at different wavelengths in the same manner as in Example 28. The results are shown in Table 30.

TABLE 30

| Charge Potential (V) | Sensitivity ($\mu J/cm^2$) at different Wavelengths | | | |
|---|---|---|---|---|
| | 400 nm | 500 nm | 600 nm | 700 nm |
| Material of Invention: 680 | 1.8 | 1.9 | 1.9 | 2.0 |
| Material for Comparison: 690 | 4.9 | 5.0 | 2.2 | 2.1 |

From the above results, it will be seen that the sensitivity of the material of the invention is better than that for comparison.

In Examples 28 and 29, X-type phthalocyanine, the binder resin and the perylene compound wee added simultaneously and dispersed to an extent sufficient to convert at least a part of the phthalocyanine were molecularly dispersed. Similar results were obtained when the perylene compound was dispersed after sufficient dispersion of X-type phthalocyanine and the binder resin.

The materials obtained in Examples 28 and 29 underwent little change when placed under high temperature and high humidity conditions or low temperature and low humidity conditions.

EXAMPLE 30

10 parts by weight of X-type metal-free phthalocyanine and 50 parts by weight of polycarbonate were dissolved in tetrahydrofuran and sufficiently dispersed. 1 part by weight of an amine derivative of the following formula

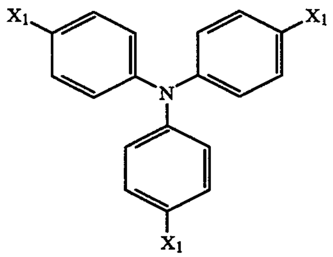

wherein each $X_1$ represents a methyl group, was added to the solution and further kneaded to obtain a photosensitive solution. The solution was coated onto an Al sheet by a spinner and dried at 120° C. for 5 hours. The resultant photosensitive layer having a single-layer structure had a thickness of 8 $\mu m$.

For comparison, the above procedure was repeated without use of the amine derivative, thereby obtaining a photosensitive material.

EXAMPLE 31

10 parts by weight of X-type metal-free phthalocyanine and 50 parts by weight of a mixture of polycarbonate and polyvinyl butyral at a mixing ratio by weight of 2:1 were dissolved in tetrahydrofuran and sufficiently dispersed. 2 parts by weight of an amine derivative of the following formula

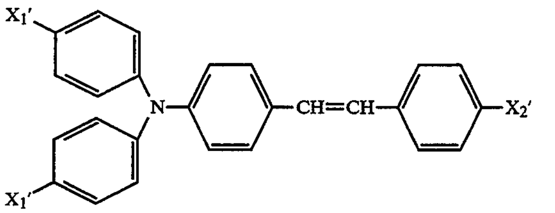

wherein each $X_1'$ represents a methyl group and $X_2'$ represents a methoxy group, were added to the solution and further kneaded to obtain a photosensitive solution. The solution was coated onto an Al sheet by a spinner and dried at 120° C. for 5 hours. The resultant photosensitive layer having a single-layer structure had a thickness of 9 $\mu m$.

For comparison, the above procedure was repeated without use of the amine derivative, thereby obtaining a photosensitive material.

The materials of Examples 30 and 31 and for comparison were each subjected to a test in the same manner as in the forgoing examples, thereby determining the values of $V_o$ and $E_{\frac{1}{2}}$. The results are shown in table 31 below.

TABLE 31

| | Vo (volt) | $E_{\frac{1}{2}}$ |
|---|---|---|
| Material of Example 30 | 400 | 3.4 |
| Material For Comparison | 410 | 5.3 |
| Material of Example 31 | 340 | 2.1 |
| Material for Comparison | 360 | 6.0 |

The above results reveal that the addition of the amine derivatives is effective in improving the charging and sensitivity characteristics.

Although two amine derivatives are tested, other amine derivatives defined by the general formulas (VI) and (VII) could be likewise used.

EXAMPLE 32

10 parts by weight of X-type phthalocyanine and 50 parts by weight of polycarbonate were dissolved in tetrahydrofuran and sufficiently dispersed. 1 part by weight of p-phenylenediamine was added, as an amino compound, to the solution, followed by further dispersion the resultant solution was coated on an Al substrate by a spinner and dried at 120° C. for 5 hours. The photosensitive layer had a thickness of 8 $\mu m$. The material was tested in the same manner as in the foregoing examples to determine the values of $E_{\frac{1}{2}}$ and $V_o$.

EXAMPLE 33

The general procedure of Example 32 was repeated using N-diphenylacetamide as the amino compound, thereby obtaining a photosensitive material. The material was tested in the same manner as in Example 32.

EXAMPLE 34

10 parts by weight of X-type metal-free phthalocyanine and 50 parts by weight a mixture of polycarbonate and polyvinyl butyral at a mixing ratio by weight of 2:1 were dissolved in tetrahydrofuran and sufficiently dispersed. Thereafter, 2 parts by weight of 6-ethoxy-2,2,4-trimethyl-1,2-dihydroquinone was added to the solution. The resultant solution was applied in the same manner as in Example 32 to form a 9 μm thick photosensitive layer. The resulting material was tested in the same manner as in Example 32.

EXAMPLE 35

The general procedure of Example 34 was repeated using 2-methylcaptobenzimidazole, thereby obtaining a photosensitive material having 9 μm thick photosensitive layer. The material was tested in the same manner as in Example 32.

EXAMPLE 36

The general procedure of Example 34 was repeated using 2 parts by weight of 3-methylindole, thereby obtaining a photosensitive material having a 10 μm thick photosensitive layer. The material was tested in the same manner as in Example 32.

EXAMPLES 37, 38

The general procedure of Example 34 was repeated using 2 parts by weight of phenothiazine and 3-phenylcarbazole, thereby obtaining photosensitive materials having 7 and 8 μm thick photosensitive layers, respectively, as Examples 37 and 38. Each material was tested in the same manner as in Example 32.

For comparison, the general procedures of Examples 32 to 38 were, respectively, repeated without use of the amine derivatives, thereby obtaining photosensitive materials.

The respective materials were tested in the same manner as in Example 32.

The results are shown in Table 32 below.

TABLE 32

| | Vo (V) | $E_{\frac{1}{2}}$ |
|---|---|---|
| Material of Example 32 | 390 | 3.4 |
| Material for Comparison | 400 | 5.3 |
| Material of Example 33 | 340 | 4.0 |
| Material for Comparison | 350 | 6.0 |
| Material of Example 34 | 405 | 3.1 |
| Material for Comparison | 400 | 4.2 |
| Material of Example 35 | 395 | 2.8 |
| Material for Comparison | 405 | 4.0 |
| Material of Example 36 | 430 | 3.0 |
| Material for Comparison | 440 | 5.0 |
| Material of Example 37 | 330 | 2.5 |
| Material for Comparison | 340 | 3.9 |
| Material of Example 38 | 380 | 2.7 |
| Material for Comparison | 390 | 4.0 |

The above results reveal that the materials of the invention are superior in charge and sensitivity characteristics to the materials for comparison.

EXAMPLE 39

X-type metal-free phthalocyanine, zinc oxide powder having a size of 0.2 μm (20553-2, available from Aldrich Chem. Co., Inc.) and polystyrene (18242-7, available from Aldrich Chem. Co., In) were mixed in tetrahydrofuran at mixing ratios of 10:2:40, followed by sufficient dispersion by ball milling. The resultant dispersion was applied onto an Al sheet by dipping and dried to obtain a photosensitive material having a layer thickness of 18 μm.

For comparison, the above procedure was repeated without use of zinc oxide, thereby obtaining a photosensitive material.

The materials were tested to determine photosensitivity, $E_{\frac{1}{2}}$, a charge potential and a residual potential, $V_r$, in the same manner as in the foregoing examples. The charge potential and photosensitivity after 10000 exposure cycles were also measured.

The results are shown in table 33 below.

TABLE 33

| Charge Potential (V) | Sensitivity (lux · second) | Residential Potential (V) | After 10000 Cycles Charge Potential (V) | After 10000 Cycles Sensitivity (lux · second) |
|---|---|---|---|---|
| Material 678 of Ex. 39 | 2.4 | 10 | 650 | 2.3 |
| Material For Comp. 657 | 3.6 | 8 | 672 | 4.0 |

EXAMPLE 40

X-type metal-free phthalocyanine and polyester (Vylon 200) were dissolved in tetrahydrofuran at a mixing ratio by weight of 1:5. Two different zinc oxides, one being sensitized with Rose Bengale, the other being sensitized with a cyanine dye, were, respectively, added to the solution in amounts indicated in Table 34, followed by sufficient dispersion by ball milling. The resultant solutions were each applied onto an Al substrate by dipping and dried to form a 20 μm thick photosensitive layer. The respective materials were subjected to irradiation with white light (10 luxes) to determine photosensitivity, $E_{\frac{1}{2}}$, and charge potential.

The results shown in Table 34.

TABLE 34

| ZnO Additive | Amount of ZnO based on Phthalocyanine (%) | Charge Potential (V) | Sensitivity (lux · second) |
|---|---|---|---|
| Rose Bengale-sensitized ZnO: | 5 | 733 | 1.9 |
| | 20 | 723 | 1.8 |
| | 50 | 741 | 2.5 |
| | 80 | 718 | 5.2 |
| Cyanine Dye-sensitized ZnO: | 5 | 699 | 3.0 |
| | 20 | 756 | 2.5 |
| | 50 | 711 | 4.5 |
| | 80 | 712 | 8.7 |
| No ZnO for Comparison: | — | 700 | 4.0 |

From this, it will be seen that good results are obtained when the amount of ZnO is not larger than 50 wt %.

EXAMPLE 41

X-type metal-free phthalocyanine and polystyrene (with an average molecular weight of 280,000, available from Aldrich Chem. Co., Inc.) were dissolved in tetrahydrofuran at ratios by weight of the phthalocyanine:polystyrene:tetrahydrofuran = 1:4:25. 2-(4-Biphenylyl)-5-(4-tert-butylphenyl)-1,3,4-oxadiazole was added to the solution in amounts of from 0.5 to 200% by weight based on the phthalocyanine. The mixture was agitated by means of a magnetic stirrer over five days. The solution was applied onto an Al substrate by spin coating and thermally treated in air at 150° C. for 3 hours to obtain a photosensitive material. The photosensitive materials obtained in this manner had a photosensitive layer with a thickness of from 15 to 20 μm.

The respective materials were subjected to measurements of charge potential and photosensitivity, $E_{\frac{1}{2}}$, immediately after the formation and after 10000 exposure cycles in the same manner as in the foregoing examples. The results are shown in Table 35.

TABLE 35

| Ratio Between Phthalocyanine and Oxazole Additive | Initial Characteristics Charge Potential (V) | Initial Characteristics Sensitivity (lux · second) | Characteristics After 10000 Exposure Charge Potential (V) | Characteristics After 10000 Exposure Sensitivity (lux · second) |
|---|---|---|---|---|
| 1:0.005 | 710 | 3.4 | 630 | 3.1 |
| 1:0.01 | 730 | 2.7 | 695 | 2.6 |
| 1:0.05 | 725 | 2.5 | 695 | 2.3 |
| 1:0.1 | 765 | 2.4 | 755 | 2.1 |
| 1:0.3 | 740 | 2.5 | 730 | 2.4 |
| 1:0.5 | 780 | 2.3 | 760 | 2.2 |
| 1:0.7 | 770 | 2.5 | 755 | 2.4 |
| 1:1 | 795 | 2.7 | 765 | 2.5 |
| 1:2 | 780 | 3.9 | 720 | 3.5 |

For comparison, the above procedure was repeated without use of the oxazole additive, followed by repetition of Example 41. The results are shown in Table 36.

TABLE 36

| Ratio Between Phthalocyanine and Oxazole Additive | Initial Characteristics Charge Potential (V) | Initial Characteristics Sensitivity (lux · second) | Characteristics After 10000 Exposure Charge Potential (V) | Characteristics After 10000 Exposure Sensitivity (lux · second) |
|---|---|---|---|---|
| 1:0 | 720 | 3.8 | 600 | 3.5 |

The results of Tables 35 and 36 reveal that when X-type metal-free phthalocyanine and the additive are used at a ratio ranging 100:1 to 1:1, the sensitivity and charge stability in repeated use are superior in the present invention.

EXAMPLE 42

X-type metal-free phthalocyanine and polyethylene terephthalate (Vylon RV-290) were dissolved in tetrahydrofuran at ratios by weight of the phthalocyanine:-polystyrene:tetrahydrofuran=1:4:20. 2,5-(4-diethylaminophenylyl)-1,3,4-oxadiazole (Aldrich Chem. Co., Inc.) was added to the solution in amounts of from 0.5 to 200% by weight based on the phthalocyanine. The mixture was agitated by means of a magnetic stirrer over five days The solution was applied onto an Al substrate by spin coating and thermally treated in air at 150° C. for 3 hours to obtain a photosensitive material. The photosensitive materials obtained in this manner had a photosensitive layer with a thickness of from 15 to 20 μm.

The respective materials were subjected to measurements of charge potential and photosensitivity, $E_{\frac{1}{2}}$, immediately after the formation and after 10000 exposure cycles in the same manner as in the foregoing examples. The results are shown in Table 37.

TABLE 37

| Ratio Between Phthalocyanine and Oxadiazole Additive | Initial Characteristics Charge Potential (V) | Initial Characteristics Sensitivity (lux · second) | Characteristics After 10000 Exposure Charge Potential (V) | Characteristics After 10000 Exposure Sensitivity (lux · second) |
|---|---|---|---|---|
| 1:0.005 | 695 | 2.7 | 625 | 2.5 |
| 1:0.01 | 680 | 2.2 | 650 | 2.0 |
| 1:0.05 | 685 | 2.1 | 670 | 2.1 |
| 1:0.1 | 695 | 2.1 | 680 | 2.0 |
| 1:0.3 | 675 | 1.9 | 655 | 1.7 |
| 1:0.5 | 640 | 2.0 | 600 | 1.8 |
| 1:0.7 | 655 | 1.8 | 595 | 1.7 |
| 1:1 | 630 | 1.8 | 510 | 1.5 |
| 1:2 | 540 | 1.7 | 300 | 1.2 |

For comparison, the above procedure was repeated without use of the oxadiazole additive, followed by repetition of Example 42. The results are shown in Table 38.

TABLE 38

| Ratio Between Phthalocyanine and Oxazole Additive | Initial Characteristics Charge Potential (V) | Initial Characteristics Sensitivity (lux · second) | Characteristics After 10000 Exposure Charge Potential (V) | Characteristics After 10000 Exposure Sensitivity (lux · second) |
|---|---|---|---|---|
| 1:0 | 670 | 3.2 | 550 | 2.8 |

The results of Tables 37 and 38 reveal that when X-type metal-free phthalocyanine and the additive are used at a ratio within a range of 100:1 to 1:1, the sensitivity and charge stability in repeated use are superior in the present invention.

What is claim is:

1. A photosensitive material for electrophotography which comprises a conductive support and a photosensitive layer having a single-layer structure and formed on said conductive support, the photosensitive layer being made of X-type metal-free phthalocyanine, a resin binder, and an electrolytically polymerized product doped with an anion, said product being used in an amount from 1 to 50 wt % based on the phthalocyanine and having recurring units of the following formula

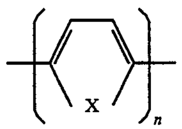

wherein X represents N—H, N-alkyl, S or O and n is an integer of at least 3, the phthalocyanine being dispersed in the resin binder partly in a molecular state and partly in a particulate state.

2. A photosensitive material according to claim 1, wherein said electrolytically polymerized product is polypyrrole or a polymer of a pyrrole derivative.

3. A photosensitive material according to claim 1, wherein said electrolytically polymerized product is polythiophene or a polymer of a thiophene derivative.

4. A photosensitive material according to claim 1, wherein n is an integer up to 50.

5. A photosensitive material according to claim 1, wherein said anion is derived from an aromatic compound.

6. A photosensitive material according to claim 5, wherein said aromatic compound is a member selected from the group consisting of alkylbenzenesulfonates, alkylnaphthalenesulfonates, alkylbenzenecarboxylates and alkylnaphthalenecarboxylates.

7. A photosensitive material for electrophotography which comprises a conductive support and a photosensitive layer having a double-layer structure and formed on said conductive support, said double-layer structure including a charge generation layer and a charge transport layer in such a way that said charge generation layer is formed on said conductive support, said charge generation layer being made of a composition which comprises a dispersion of a charge generating agent, a binder resin and an electrolytically polymerized product doped with an anion, which product is added in an amount of 1 to 50 wt % based on said charge generating agent and has recurring units of the following formula

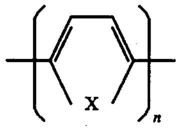

wherein X represents N—H, N-alkyl, S or O and n is an integer of at least 3.

8. A photosensitive material according to claim 7, wherein said electrolytically polymerized product is polypyrrole or a polymer of a pyrrole derivative.

9. A photosensitive material according to claim 7, wherein said electrolytically polymerized product is polythiophene or a polymer of a thiophene derivative.

10. A photosensitive material according to claim 7, wherein n is an integer up to 50.

11. A photosensitive material according to claim 7, wherein said anion is derived from an aromatic compound.

12. A photosensitive material according to claim 11, wherein said aromatic compound is a member selected from the group consisting of alkylbenzenesulfonates, alkylnaphthalenesulfonates, alkylbenzenecarboxylates and alkylnaphthalenecarboxylates.

13. A photosensitive material according to claim 7, wherein said charge generating agent is X-type metal-free phthalocyanine.

14. A photosensitive material for electrophotography which comprises a conductive support and a photosensitive layer having a double-layer structure and formed on said conductive support, said double-layer structure including a charge generation layer and a charge transport layer in such a way that said charge generation layer is formed on said conductive support, said charge transport layer being made of a composition which comprises a dispersion of a charge transport agent, a binder resin and an electrolytically polymerized product doped with an anion, which product is added in an amount of 1 to 50 wt % based on said charge transport agent and has recurring units of the following formula

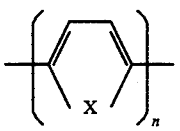

wherein X represents N—H, N-alkyl, S or O and n is an integer of at least 3.

15. A photosensitive material according to claim 14, wherein said electrolytically polymerized product is polypyrrole or a polymer of a pyrrole derivative.

16. A photosensitive material according to claim 14, wherein said electrolytically polymerized product is polythiophene or a polymer of a thiophene derivative.

17. A photosensitive material according to claim 14, wherein n is an integer up to 50.

18. A photosensitive material according to claim 14, wherein said anion is derived from an aromatic compound.

19. A photosensitive material according to claim 18, wherein said aromatic compound is a member selected from the group consisting of alkylbenzenesulfonates, alkylnaphthalenesulfonates, alkylbenzenecarboxylates and alkylnaphthalenecarboxylates.

20. A photosensitive material for electrophotography which comprises a conductive support and a photosensitive layer having a single-layer structure and formed on said conductive support, the photosensitive layer being made of X-type metal-free phtalocyanine, a resin binder, and a dye of the following general formula added in an amount of from 0.01 to 1 mole per mole of the phthalocyanine, the phthalocyanine being dispersed in the resin binder partly in a molecular state and partly in a particulate state,

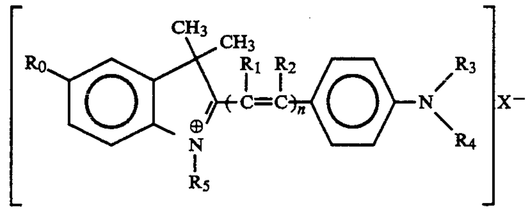

wherein $R_1$, $R_2$, $R_3$ and $R_4$ independently represent hydrogen or a lower alkyl group having from 1 to 6 carbon atoms, $R_0$ represents hydrogen, a lower alkyl group having 1 to 6 carbon atoms, or a halogen atom, $R_5$ represents an alkyl group having from 1 to 6 carbon atoms and terminated with —OH, —SH or —NH, and X represents a halogen atom, $—ClO_4$, $—PF_6$ or $—BF_4$.

21. A photosensitive material according to claim 20, wherein said binder resin has an aromatic ring.

22. A photosensitive material according to claim 21, wherein said binder resin is polyester or polycarbonate.

23. A photosensitive material for electrophotography which comprises a conductive support and a photosensitive layer having a single-layer structure and formed on said conductive support, the photosensitive layer being made of X-type metal-free phthalocyanine, a resin binder, and a silane-coupling agent having a hydrolyzable group and added in an amount of from 1 to 50 wt % based on the phthalocyanine, the phthalocyanine being dispersed in the resin binder partly in a molecular state and partly in a particulate state.

24. A photosensitive material according to claim 23, wherein said silane coupling agent is added after dispersion of said phthalocyanine in a resin binder partly in a molecular state and partly in a particulate state.

25. A photosensitive material for electrophotography which comprises a conductive support and a photosensitive layer having a single-layer structure and formed on said conductive support, the photosensitive layer being made of X-type metal-free phthalocyanine, a resin binder, and a polysilane compound and added in an amount of from 0.1 to 50 wt % based on the phthalocyanine, the phthalocyanine being dispersed in the resin binder partly in a molecular state and partly in a particulate state.

26. A photosensitive material according to claim 25, wherein said binder resin has an aromatic ring.

27. A photosensitive material according to claim 25, wherein said binder resin comprises a light or heat curable resin.

28. A photosensitive material according to claim 25, wherein said binder resin consists essentially of a light or heat curable resin.

29. A photosensitive material according to claim 25, wherein said binder resin comprises a mixture of a resin having an aromatic ring and a light or heat curable resin.

30. A photosensitive material for electrophotography which comprises a conductive support and a photosensitive layer having a single-layer structure and formed on said conductive support, the photosensitive layer being made of X-type metal-free phthalocyanine, a resin binder, and a combination of a hole transport substance and an electron transport substance added in equimolar amounts, each from 0.01 to 5 moles per mole of the phthalocyanine, the phthalocyanine being dispersed in the resin binder partly in a molecular state and partly in a particulate state.

31. A photosensitive material according to claim 30, wherein said hole transport substance is of the following general formula

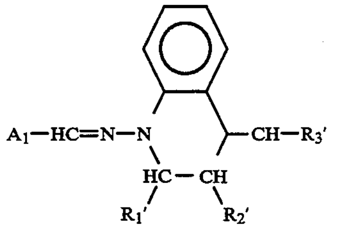

wherein $A_1$ represents an unsubstituted or substituted aromatic hydrocarbon group or aromatic heterocyclic group, $R_1'$, $R_2'$ and $R_3'$ independently represent hydrogen, a halogen or an unsubstituted or substituted alkyl group, aralkyl group or aryl group.

32. A photosensitive material according to claim 31, wherein said hole transport substance is of the following general formula

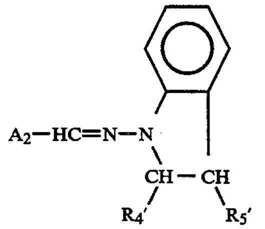

wherein $A_2$ represents an unsubstituted or substituted aromatic hydrocarbon group or aromatic heterocyclic group, $R_4'$ and $R_5'$ independently represent hydrogen, a halogen or an unsubstituted or substituted alkyl group, aralkyl group or aryl group.

33. A photosensitive material according to claim 31, wherein said electron transport substance is a member selected from the group consisting of diazo pigments, perylene pigments, anthanthrone pigments, thiapyrylium pigments, thiapyrylium salt derivatives and pyrylium salt derivatives and cyanine derivatives.

34. A photosensitive material for electrophotography which comprises a conductive support and a photosensitive layer having a single-layer structure and formed on said conductive support, the photosensitive layer being made of X-type metal-free phthalocyanine, a resin binder, and a combination of a silicone compound and a fluorine-containing material each added in an amount of from 0.1 to 5 wt %, based on the phthalocyanine, the phthalocyanine being dispersed in the resin binder partly in a molecular state and partly in a particulate state.

35. A photosensitive material according to claim 34, wherein either the silicone compound or fluorine-containing compound has an amino or carbonyl group.

36. A photosensitive material according to claim 34, wherein said binder resin is a member selected from the group consisting of polyesters, polycarbonates and mixtures thereof.

37. A photosensitive material for electrophotography which comprises a conductive support and a photosensitive layer having a single-layer structure and formed on said conductive support, the photosensitive layer being made of X-type metal-free phthalocyanine, a resin binder, and an electron acceptor compound added in an amount of from 0.01 to 0.5 moles per mole of the X-type metal-free phthalocyanine, the phthalocyanine being dispersed in the resin binder partly in a molecular state and partly in a particulate state.

38. A photosensitive material according to claim 37, wherein said electron acceptor compound is a polycyclic aromatic nitro compound.

39. A photosensitive material according to claim 38, wherein said nitro compound is a member selected from the group consisting of tri and tetranitrofluorenone.

40. A photosensitive material according to claim 37, wherein said electron acceptor compound is tetracyanoquinodimethane.

41. A photosensitive material according to claim 37, wherein said binder resin is a member selected from polyesters, polycarbonates and mixtures thereof.

42. A photosensitive material for electrophotography which comprises a conductive support and a photosensitive layer having a single-layer structure and formed on said conductive support, the photosensitive layer being made of X-type metal-free phthalocyanine, a resin binder, and a combination a thiapyrylium dye and 1,1-bis(4-N,N-diethylamin-2-methylphenyl)-1-phenylmethane, respectively, added in amounts of from 0.01 to 5 moles and from 0.01 to 5 moles per mole of the X-type metal-free phthalocyanine, the phthalocyanine being dispersed in the resin binder partly in a molecular state and partly in a particulate state.

43. A photosensitive material according to claim 42, wherein said thiapyrylium dye is triphenylthiapyrylium perchlorate.

44. A photosensitive material according to claim 42, wherein said binder resin is a member selected from the group consisting of polyesters, polycarbonates and mixtures thereof.

45. A photosensitive material for electrophotography which comprises a conductive support and a photosensitive layer having a single-layer structure and formed on said conductive support, the photosensitive layer being made of X-type metal-free phthalocyanine, a resin binder, and zinc oxide powder present in an amount of from 1 to 50 wt % based on the X-type metal-free phthalocyanine, the phthalocyanine being dispersed in the resin binder partly in a molecular state and partly in a particulate state.

46. A photosensitive material according to claim 45, wherein said photosensitive layer is formed from a dispersion which is obtained by treating the X-type metal-free phthalocyanine and the binder resin in a solvent until the phthalocyanine is dispersed in the resin binder partly in a molecular state and partly in a particulate state, and adding the zinc oxide powder to the resulting mixture.

47. A photosensitive material according to claim 45, wherein said photosensitive layer is formed from a dispersion which is obtained by treating the X-type metal-free phthalocyanine, the binder resin and the zinc oxide powder simultaneously in a solvent until the phthalocyanine is dispersed in the resin binder partly in a molecular state and partly in a particulate state.

48. A photosensitive material according to claim 45, wherein said zinc oxide powder is sensitized with a dye.

49. A photosensitive material for electrophotography which comprises a conductive support and a photosensitive layer having a single-layer structure and formed on said conductive support, the photosensitive layer being made of X-type metal-free phthalocyanine, a resin binder, and an oxadiazole present in an amount of from 1 to 100 wt % based on the X-type metal-free phthalocyanine, the phthalocyanine being dispersed in the resin binder partly in a molecular state and partly in a particulate state.

50. A photosensitive material according to claim 49, wherein said oxadiazole is of the following general formula

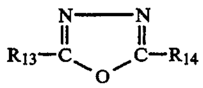

wherein $R_{13}$ and $R_{14}$ independently represent hydrogen, a halogen, a lower alkyl group, an aryl group, a lower alkoxy group, an aralkyl group,, an amino group, a vinyl group or a hydroxyl group.

51. A photosensitive material according to claim 49, wherein said photosensitive layer is formed from a dispersion which is obtained by treating the X-type metal-free phthalocyanine and the binder resin in a solvent until the phthalocyanine is dispersed in the resin binder partly in a molecular state and partly in a particulate state, and adding the oxadiazole to the resulting mixture.

* * * * *